United States Patent
Gong et al.

(10) Patent No.: US 11,234,198 B2
(45) Date of Patent: Jan. 25, 2022

(54) SOUNDING REFERENCE SIGNAL TRANSMISSION METHOD, AND APPARATUS

(71) Applicant: HUAWEI TECHNOLOGIES CO., LTD., Guangdong (CN)

(72) Inventors: Zhengwei Gong, Shanghai (CN); Yi Qin, Kista (SE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/992,408

(22) Filed: Aug. 13, 2020

(65) Prior Publication Data
US 2020/0374814 A1 Nov. 26, 2020

Related U.S. Application Data

(63) Continuation of application No. PCT/CN2019/074914, filed on Feb. 13, 2019.

(30) Foreign Application Priority Data

Feb. 14, 2018 (CN) .......................... 201810152365.4

(51) Int. Cl.
| H04W 52/34 | (2009.01) |
| H04L 5/00 | (2006.01) |
| H04W 52/14 | (2009.01) |

(52) U.S. Cl.
CPC ........... H04W 52/34 (2013.01); H04L 5/0023 (2013.01); H04L 5/0048 (2013.01); H04W 52/146 (2013.01)

(58) Field of Classification Search
CPC . H04L 25/0224; H04L 5/0023; H04B 7/0456; H04W 52/34
(Continued)

(56) References Cited

U.S. PATENT DOCUMENTS

2013/0272257 A1    10/2013 Takaoka et al.
2020/0053724 A1*    2/2020 MolavianJazi ....... H04W 72/10
(Continued)

FOREIGN PATENT DOCUMENTS

CN    102149182 A    8/2011
CN    102300303 A    12/2011
(Continued)

OTHER PUBLICATIONS

Oppo Remaining issues on uplink non-codebook transmission 3GPP Draft;R1-1719965 ,Nov. 18, 2017, XP051369661,total 4 pages.
(Continued)

*Primary Examiner* — John J Lee
(74) *Attorney, Agent, or Firm* — Westerman, Hattori, Daniels & Adrian, LLP

(57) ABSTRACT

An SRS transmission method is provided, including: determining a quantity of ports corresponding to each of a plurality of SRS resources on a first time domain resource, where the plurality of SRS resources belong to a first SRS resource set; determining, based on the quantity of ports and transmit power corresponding, in a first time unit, to the first SRS resource set, transmit power of each port corresponding to each of the plurality of SRS resources, where a sum of transmit power of all ports corresponding to the plurality of SRS resources is less than or equal to transmit power corresponding to the first SRS resource set, and the first time unit includes the first time domain resource; and simultaneously transmitting, on the first time domain resource based on the transmit power of each port, SRSs carried in the plurality of SRS resources.

20 Claims, 7 Drawing Sheets

(58) Field of Classification Search
USPC .................................. 455/522, 69, 452.1, 509
See application file for complete search history.

(56) References Cited

U.S. PATENT DOCUMENTS

| | | | | |
|---|---|---|---|---|
| 2020/0221405 A1* | 7/2020 | Zarifi | ............... | H04W 52/325 |
| 2020/0314768 A1* | 10/2020 | Shi | ............... | H04W 52/325 |
| 2020/0351801 A1* | 11/2020 | Jeon | ............... | H04W 52/362 |

FOREIGN PATENT DOCUMENTS

| | | |
|---|---|---|
| CN | 102577536 A | 7/2012 |
| CN | 107332652 A | 11/2017 |
| EP | 3257188 B1 | 10/2018 |
| WO | 2010129885 A1 | 11/2010 |

OTHER PUBLICATIONS

Huawei et al: UL beam management,3GPP Draft;R1-1709928,Jun. 17, 2017,XP051304668,total 5 pages.

Huawei et al:Discussion on UL SRS transmission power 3G PP Draft;R1-1710459;Jun. 17, 2017 XP051305057,total 4 pages.

Huawei et al UL SRS design for beam management CSIacquisition 3GPP Draft;R1-1706938; 2017-05-98 XP051263400,total 9 pages.

Extended (Supplementary) European Search Report dated Mar. 10, 2021, issued in counterpart EP Application No. 19755049.4. (12 pages).

Qualcomm Incorporated, "Remaining details on SRS",3GPP TSG RAN WG1 Meeting 91 R1-1720670,Reno, USA, Nov. 27 Dec. 1, 2017,Total 7 Pages.

3GPP TS 36.213 V15.0.0 (Dec. 2017);3rd Generation Partnership Project;Technical Specification Group Radio Access Network;Evolved Universal Terrestrial Radio Access (E-UTRA);Physical layer procedures(Release 15);total 493 pages.

International Search Report dated May 8, 2019, issued in counterpart Application No. PCT/CN2019/074914, with English Translation. (14 pages).

Office Action dated Jun. 2, 2021, issued in counterpart CN application No. 201810152365.4. (8 pages).

* cited by examiner

SOUNDING REFERENCE SIGNAL TRANSMISSION METHOD, AND APPARATUS

CROSS-REFERENCE TO RELATED APPLICATIONS

This application is a continuation of International Application No. PCT/CN2019/074914, filed on Feb. 13, 2019, which claims priority to Chinese Patent Application No. 201810152365.4, filed on Feb. 14, 2018. The disclosures of the aforementioned applications are hereby incorporated by reference in their entireties.

TECHNICAL FIELD

This application relates to the field of wireless communications, and in particular, to a sounding reference signal transmission method and an apparatus.

BACKGROUND

A sounding reference signal (SRS) is a type of reference signal that can be used for channel estimation. A network device may calculate a signal-to-noise ratio of a channel based on the SRS, and allocate a transmission resource to a terminal device based on the signal-to-noise ratio.

In a long term evolution (LTE) system, an SRS occupies a last single carrier frequency division multiple access (SC-FDMA) symbol of a subframe, where the SC-FDMA symbol is an SRS resource, and one SRS resource supports at least one port. A plurality of ports may multiplex one SRS resource in a frequency division manner and a code division manner.

In a fifth generation (5G) mobile communications system, SRS resource configuration is more flexible. One or more SRS resource sets may be configured for one time unit, each SRS resource set includes at least one SRS resource, and each SRS resource may be multiplexed by at least one port. When all or some SRS signals corresponding to a plurality of SRS resources or a plurality of SRS resource sets are simultaneously transmitted in one time unit, how to allocate SRS transmit power corresponding to the plurality of SRS resources or the plurality of SRS resource sets is a problem that needs to be urgently resolved currently.

SUMMARY

This application provides an SRS transmission method and an apparatus, to support allocation of transmit power of each port when a plurality of SRSs are simultaneously transmitted.

According to a first aspect, an SRS transmission method is provided. The method includes: determining a quantity of ports corresponding to each of a plurality of SRS resources on a first time domain resource, where the plurality of SRS resources belong to a first SRS resource set; determining, based on the quantity of ports corresponding to each of the plurality of SRS resources and transmit power corresponding, in a first time unit, to the first SRS resource set, transmit power of each port corresponding to each of the plurality of SRS resources, where a sum of transmit power of all ports corresponding to the plurality of SRS resources is less than or equal to transmit power corresponding to the first SRS resource set, and the first time unit includes the first time domain resource, or the first time unit is the first time domain resource; and simultaneously transmitting, on the first time domain resource based on the transmit power of each port corresponding to each of the plurality of SRS resources, SRSs carried in the plurality of SRS resources.

According to the solution provided in this embodiment, the transmit power of each port may be determined based on a total quantity of ports corresponding to the plurality of SRS resources. For example, when the total quantity of ports corresponding to the plurality of SRS resources exceeds a quantity threshold, it is determined that the transmit power of each port is a relatively small value. When the total quantity of ports corresponding to the plurality of SRS resources is less than the quantity threshold, it is determined that the transmit power of each port is a relatively large value. Therefore, it can be ensured that the sum of transmit power of all ports corresponding to the plurality of SRS resources is not greater than the transmit power corresponding to the first SRS resource set, thereby avoiding a communication fault caused because the sum of transmit power of all ports corresponding to the plurality of SRS resources exceeds the transmit power corresponding to the first SRS resource set.

Optionally, the transmit power of each port corresponding to each of the plurality of SRS resources is equal.

Allocating same power to a plurality of ports corresponding to a same SRS resource set can reduce a work burden of a receive end. This is because when transmit power of the plurality of ports is the same, the receive end needs to determine quality of a transmission resource (such as a beam) only based on receive power, and does not need to consider the transmit power.

Optionally, the determining, based on the quantity of ports corresponding to each of the plurality of SRS resources and transmit power corresponding, in a first time unit, to the first SRS resource set, transmit power of each port corresponding to each of the plurality of SRS resources includes: determining, based on a quantity of the plurality of SRS resources on the first time domain resource and the transmit power corresponding, in the first time unit, to the first SRS resource set, transmit power corresponding to each of the plurality of SRS resources, where the transmit power corresponding to each of the plurality of SRS resources is equal, and a sum of transmit power corresponding to all of the plurality of SRS resources is less than or equal to the transmit power corresponding, in the first time unit, to the first SRS resource set; and determining, based on the transmit power corresponding to each of the plurality of SRS resources on the first time domain resource and the quantity of ports corresponding to each of the plurality of SRS resources, the transmit power of each port corresponding to each of the plurality of SRS resources, where a sum of transmit power of all ports corresponding to any one of the plurality of SRS resources is less than or equal to transmit power corresponding to any one SRS resource.

Different SRS resource sets may be used to measure different physical quantities. First, the transmit power corresponding to the first SRS resource set is evenly allocated to all SRS resources in the first SRS resource set, and then a next step is to allocate the power based on the quantity of ports corresponding to each SRS resource, thereby ensuring fairness of measuring the different physical quantities by the receive end based on all the SRS resources in the first SRS resource set.

According to a second aspect, a sounding reference signal transmission method is provided. The method includes: determining a plurality of pieces of first transmit power corresponding to a plurality of SRS resource sets on a second time domain resource, where the plurality of SRS resource sets are in a one-to-one correspondence with the plurality of pieces of first transmit power; determining, based on a value relationship between a power threshold on the second time domain resource and a sum of the plurality of pieces of first transmit power corresponding to the plurality of SRS resource sets on the second time domain resource, a plurality of pieces of second transmit power corresponding to the plurality of SRS resource sets on the second time domain resource, where a sum of the plurality of pieces of second transmit power is less than or equal to the power threshold, and the plurality of pieces of second transmit power are in a one-to-one correspondence with the plurality of SRS resource sets; and simultaneously transmitting, on the second time domain resource based on the plurality of pieces of second transmit power, SRSs carried in the plurality of SRS resource sets.

Each SRS resource set corresponds to a piece of first transmit power. When the SRSs carried in the plurality of SRS resource sets are simultaneously transmitted, the second transmit power corresponding to the plurality of SRS resource sets may be determined based on the value relationship between the sum of the first transmit power of the plurality of SRS resource sets and the power threshold. For example, when the sum of the first transmit power of the plurality of SRS resource sets is greater than the power threshold, one or more pieces of first transmit power of one or more of the plurality of SRS resource sets may be reduced. Optionally, SRSs may not be sent on the one or more SRS resource sets. When the sum of the first transmit power of the plurality of SRS resource sets is less than or equal to the power threshold, the first transmit power of the plurality of SRS resource sets may not be adjusted. Therefore, it can be ensured that the sum of the plurality of pieces of second transmit power is less than or equal to the power threshold, to avoid a communication fault caused when a plurality of SRSs are transmitted on a time domain resource (such as a symbol) based on the first transmit power of the plurality of SRS resource sets and because the sum of the first transmit power of the plurality of SRS resource sets exceeds maximum transmit power of the time domain resource.

Optionally, the determining, based on a value relationship between a power threshold on the second time domain resource and a sum of the plurality of pieces of first transmit power corresponding to the plurality of SRS resource sets on the second time domain resource, a plurality of pieces of second transmit power corresponding to the plurality of SRS resource sets on the second time domain resource includes: determining at least one power adjustment factor based on the value relationship between the power threshold on the second time domain resource and the sum of the plurality of pieces of first transmit power corresponding to the plurality of SRS resource sets on the second time domain resource, where the at least one power adjustment factor is a value greater than or equal to 0; and determining, based on the at least one power adjustment factor and the plurality of pieces of first transmit power corresponding to the plurality of SRS resource sets on the second time domain resource, the plurality of pieces of second transmit power, where the plurality of SRS resource sets include a second SRS resource set, the at least one power adjustment factor includes a first power adjustment factor, and second transmit power corresponding to the second SRS resource set is equal to a product of the first power adjustment factor and first transmit power corresponding to the second SRS resource set.

A plurality of power adjustment factors may be preconfigured, and the at least one power adjustment factor is determined based on the value relationship between the power threshold and the sum of the plurality of pieces of first transmit power. For example, when the sum of the plurality of pieces of first transmit power is greater than the power threshold, a larger difference indicates a smaller value of the power adjustment factor determined from the plurality of power adjustment factors, or a smaller difference indicates a larger value of the power adjustment factor determined from the plurality of power adjustment factors. Therefore, the second transmit power of the plurality of SRS resource sets may be flexibly adjusted when the sum of the plurality of pieces of first transmit power is ensured to not exceed the power threshold.

Optionally, the determining at least one power adjustment factor based on the value relationship between the power threshold on the second time domain resource and the sum of the plurality of pieces of first transmit power corresponding to the plurality of SRS resource sets on the second time domain resource includes: determining the at least one power adjustment factor when the power threshold on the second time domain resource is less than the sum of the plurality of pieces of first transmit power corresponding to the plurality of SRS resource sets on the second time domain resource.

When the sum of the plurality of pieces of first transmit power is greater than the power threshold, a terminal device adjusts the first transmit power based on the power adjustment factor. When the sum of the plurality of pieces of first transmit power is not greater than the power threshold, a terminal device does not need to determine the power adjustment factor, and does not need to adjust the plurality of pieces of first transmit power, thereby reducing a burden of the terminal device.

Optionally, the determining at least one power adjustment factor based on the value relationship between the power threshold on the second time domain resource and the sum of the plurality of pieces of first transmit power corresponding to the plurality of SRS resource sets on the second time domain resource includes: determining one power adjustment factor based on the value relationship between the power threshold on the second time domain resource and the sum of the plurality of pieces of first transmit power corresponding to the plurality of SRS resource sets on the second time domain resource, where when the sum of the plurality of pieces of first transmit power is greater than the power threshold, the power adjustment factor is less than or equal to a value obtained through dividing the power threshold by the sum of the plurality of pieces of first transmit power.

The value obtained through dividing the power threshold by the sum of the plurality of pieces of first transmit power may be used as the power adjustment factor, so that the first transmit power of each SRS resource set may be reduced proportionally, thereby ensuring fairness of allocating transmit power to each SRS resource set.

Optionally, the plurality of SRS resource sets on the second time domain resource include a third SRS resource set and the second SRS resource set, SRS transmission of the second SRS resource set on the second time domain resource is initial transmission, and SRSs in the third SRS resource set are initially transmitted on a third time domain resource before the second time domain resource, where the determining at least one power adjustment factor based on the value relationship between the power threshold on the second time domain resource and the sum of the plurality of pieces of first transmit power corresponding to the plurality of SRS resource sets on the second time domain resource includes: when the sum of the plurality of pieces of first transmit power on the second time domain resource is greater than the power threshold on the second time domain resource, determining that second transmit power corresponding to the third SRS resource set is equal to second transmit power of the third SRS resource set on the third time domain resource, and determining that a power adjustment factor corresponding to the second SRS resource set is a value less than 1.

If the initial SRS transmission corresponding to the third SRS resource set is prior to the initial SRS transmission corresponding to the second SRS resource set, second transmit power of the third SRS resource set on the second time domain resource is the same as the second transmit power of the third SRS resource set on the third time domain resource, that is, a power adjustment factor of the third SRS resource set on the second time domain resource is the same as that of the third SRS resource set on the third time domain resource, thereby ensuring fairness of allocating transmit power to each SRS resource in the third SRS resource set.

Optionally, the determining, based on a value relationship between a power threshold on the second time domain resource and a sum of the plurality of pieces of first transmit power corresponding to the plurality of SRS resource sets on the second time domain resource, a plurality of pieces of second transmit power corresponding to the plurality of SRS resource sets on the second time domain resource includes: when the sum of the plurality of pieces of first transmit power corresponding to the plurality of SRS resource sets on the second time domain resource is greater than the power threshold on the second time domain resource, determining, based on a priority of each of the plurality of SRS resource sets, that second transmit power of at least one of the plurality of SRS resource sets is 0, where the priority is used to indicate a sequence in which second transmit power of each of the plurality of SRS resource sets is set to 0, an SRS resource set in the plurality of SRS resource sets other than the at least one SRS resource set is a remaining SRS resource set, a sum of first transmit power of the remaining SRS resource set is less than or equal to the power threshold on the second time domain resource, and second transmit power of the remaining SRS resource set is equal to the first transmit power of the remaining SRS resource set.

When the sum of the first transmit power corresponding to the plurality of SRS resource sets is greater than the power threshold, the second transmit power of the at least one of the plurality of SRS resource sets may be set to 0 based on the priority, and a drop operation is performed. For example, there are four SRS resource sets on the second time domain resource, if a sum of first transmit power of the four SRS resource sets is greater than the power threshold corresponding to the second time domain resource, second transmit power of one, two, or three of the SRS resource sets may be set to 0 based on the priority, to avoid a communication fault caused when a plurality of SRSs are transmitted on a time domain resource (such as a symbol) based on the first transmit power of the plurality of SRS resource sets and because the sum of the first power of the plurality of SRS resource sets exceeds maximum transmit power of the time domain resource.

Optionally, the priority is a sequence of set numbers of the plurality of SRS resource sets.

The priority may be determined based on the sequence of set numbers of the plurality of SRS resource sets, for example, second transmit power of an SRS resource set with a relatively small set number is preferentially set to 0, or another priority may be determined based on the sequence of set numbers.

Optionally, the priority is a priority of a resource type of each of the plurality of SRS resource sets, and the priority of the resource type is a priority determined based on an emergency degree of information transmitted on a resource.

The priority may be determined based on the resource type corresponding to each of the plurality of SRS resource sets. The resource type may be a periodic type, an aperiodic type, a semi-persistent type, or the like. For example, a priority of an SRS resource set corresponding to the aperiodic resource type is higher than a priority of an SRS resource set corresponding to the semi-persistent resource type, and the priority of the SRS resource set corresponding to the semi-persistent resource type is higher than a priority of an SRS resource set corresponding to the periodic resource type. A lower priority of a resource type indicates that second transmit power of an SRS resource set corresponding to the resource type is more preferentially set to 0.

During resource allocation, a resource collision may occur. For example, the resource collision occurs between a periodic SRS resource set and a burst SRS resource set during resource allocation. In this case, a communications system determines the priority based on the resource type. When a collision occurs in a power control scenario (to be specific, transmit power for simultaneously transmitting SRSs on a plurality of SRS resource sets is greater than maximum transmit power of a time domain resource), a defined priority of a resource type may be used as a priority in the power control scenario, or a priority may be specifically defined for the power control scenario, to determine a sequence in which second transmit power of the plurality of SRS resource sets is set to 0.

According to a third aspect, an apparatus is provided. The apparatus has a function of an execution device for implementing the method in the foregoing aspects, and includes a corresponding part (means) configured to perform a step or a function described in the foregoing method aspects. The step or function may be implemented by using software, hardware (for example, a circuit), or a combination of hardware and software.

In a possible design, the apparatus includes one or more processors and one or more communications units. The one or more processors are configured to support the apparatus in implementing a corresponding function of the execution device of the foregoing method, for example, determining a quantity of ports corresponding to each of a plurality of SRS resources on a first time domain resource. The one or more communications units are configured to support the apparatus in communicating with another device, to implement a receiving function and/or a sending function, for example, simultaneously transmit SRSs carried in the plurality of SRS resources on the first time domain resource.

Optionally, the apparatus may further include one or more memories. The memory is configured to couple to the processor, and stores a program instruction and/or data that are/is necessary for the apparatus. The one or more memories may be integrated with the processor, or may be separate from the processor. This is not limited in this application.

The apparatus may be an intelligent terminal, a wearable device, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver or an input/output circuit to receive and send a signal, the memory is configured to store a computer program, and the processor is configured to run the computer program in the memory, so that the apparatus performs the method in any one of the first aspect or the possible implementations of the first aspect, or the method in any one of the second aspect or the possible implementations of the second aspect.

According to a fourth aspect, a communications system is provided. The communications system includes the apparatus according to the third aspect, and the communications system further includes a communications device that receives SRSs sent by the apparatus.

According to a fifth aspect, a computer-readable storage medium is provided and is configured to store a computer program. The computer program includes an instruction used to perform the method in any one of the first aspect or the possible implementations of the first aspect.

According to a sixth aspect, a computer-readable storage medium is provided and is configured to store a computer program. The computer program includes an instruction used to perform the method in any one of the second aspect or the possible implementations of the second aspect.

According to a seventh aspect, a computer program product is provided. The computer program product includes computer program code. When the computer program code is run on a computer, the computer is enabled to perform the method in any one of the first aspect or the possible implementations of the first aspect.

According to an eighth aspect, a computer program product is provided. The computer program product includes computer program code. When the computer program code is run on a computer, the computer is enabled to perform the method in any one of the second aspect or the possible implementations of the second aspect.

DESCRIPTION OF EMBODIMENTS

Figure 1:
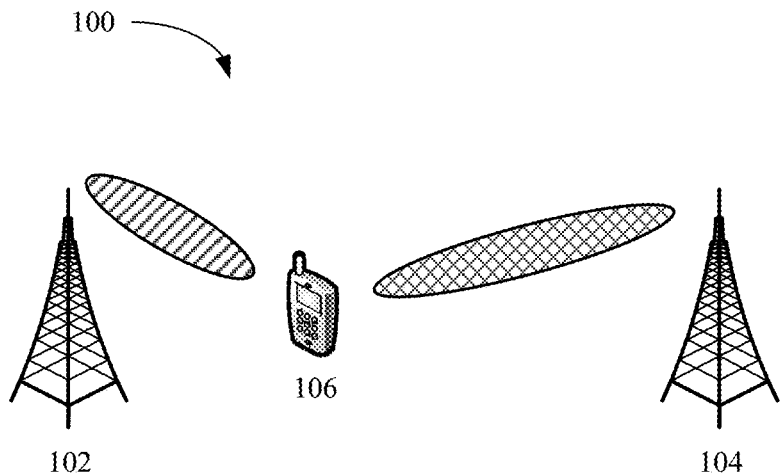
FIG. 1 is a schematic diagram of a communications system to which this application is applicable.

The following describes technical solutions of this application with reference to the accompanying drawings.

The technical solutions provided in this application may be applied to various communications systems, for example, a 5G system. The 5G system in this application includes a non-standalone (NSA) 5G system and/or a standalone (SA) 5G system. The technical solutions provided in this application may be further applied to a future communications system, for example, a sixth-generation mobile communications system.

All aspects, embodiments, or features are presented in this application based on a system that may include a plurality of devices, components, and modules. It should be understood that systems may include additional devices, components, and modules, and/or may not include all the devices, components, and modules discussed with reference to the accompanying drawings. In addition, a combination of these solutions may further be used.

In addition, the term "for example" in embodiments of this application is used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner.

In the embodiments of this application, information, a signal, a message, or a channel may be interchangeably used sometimes. It should be noted that expressed meanings are consistent when differences are not emphasized. "Of", "corresponding (relevant)", and "corresponding" may be interchangeably used sometimes. It should be noted that expressed meanings are consistent when differences are not emphasized.

In the embodiments of this application, sometimes a subscript in, for example, $W_1$ may be written in an incorrect form such as W1. Expressed meanings are consistent when differences are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and the emergence of new service scenarios, the technical solutions provided in the embodiments of this application are also applicable to similar technical problems.

The embodiments of this application may be applied to a conventional typical network, or may be applied to a future user equipment (UE) centric (UE-centric) network. A non-cell network architecture is introduced to the UE-centric network. To be specific, a large quantity of small cells are deployed in a specific area to form a hyper cell, and each small cell is a transmission point (TP) of the hyper cell or a transmission reception point (TRP) of the hyper cell, and is connected to a centralized controller. When UE moves in the hyper cell, a network device selects, for the UE in real time, a new sub-cluster to serve the UE, thereby avoiding a real cell handover, and implementing service continuity of the UE. The network device includes a wireless network device. Alternatively, in the UE-centric network, a plurality of network devices such as small cells may have independent controllers such as distributed controllers. Each small cell can independently schedule a UE, and information is exchanged between the small cells, so that the small cells can provide a coordinated service for the UE flexibly to some extent.

In the embodiments of this application, different base stations may be base stations having different identifiers, or may be base stations that have a same identifier and that are deployed at different geographical locations. Before being deployed, a base station does not know whether the base station is related to a scenario to which the embodiments of this application are applied. Therefore, before being deployed, the base station or a baseband chip needs to support a method provided in the embodiments of this application. It may be understood that the foregoing base stations having different identifiers may refer to base station identifications, cell identifiers, or other identifiers.

In some scenarios in the embodiments of this application, a scenario of a new radio (NR) network in a wireless communications network is used as an example for description. It should be noted that the solutions in the embodiments of this application may further be applied to another wireless communications network, a corresponding name may also be replaced with a name of a corresponding function in the another wireless communications network.

For ease of understanding the embodiments of this application, a communications system shown in FIG. 1 is first used as an example to describe in detail a communications system to which the embodiments of this application is applicable. FIG. 1 is a schematic diagram of the communications system to which a communication method according to an embodiment of this application is applicable. As shown in FIG. 1, the communications system 100 includes a network device 102 and a terminal device 106. A plurality of antennas may be configured for the network device 102, and a plurality of antennas may also be configured for the terminal device. Optionally, the communications system may further include a network device 104, and a plurality of antennas may also be configured for the network device 104.

It should be understood that the network device 102 or the network device 104 may further include a plurality of components (for example, a processor, a modulator, a multiplexer, a demodulator, or a demultiplexer) related to signal sending and receiving.

The network device 102 or the network device 104 includes but is not limited to an evolved NodeB (eNB), a radio network controller (RNC), a NodeB (NB), a base station controller (BSC), a base transceiver station (BTS), a home base station (such as a home evolved NodeB, or a home Node B, HNB), a baseband unit (BU), an access point (AP) in a wireless fidelity (WIFI) system, a wireless relay node, a wireless backhaul node, a TRP, a TP, and the like, or may include a gNB, a TRP, or a TP in a 5G system, or one antenna panel or one group of antenna panels (including a plurality of antenna panels) of a base station in a 5G system, or may include a network node, for example, a baseband unit (building baseband unit, BBU) or a distributed unit (DU), constituting a gNB or a TP.

In some deployment, the gNB may include a centralized unit (CU) and a DU. The gNB may further include a radio frequency unit (radio unit, RU). The CU implements some functions of the gNB, and the DU implements some functions of the gNB. For example, the CU implements functions of a radio resource control (RRC) layer, and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or may be converted from information at the PHY layer. Therefore, in this architecture, it may be considered that higher layer signaling such as RRC layer signaling or PHCP layer signaling is also sent by the DU, or is sent by the DU and the RU. It may be understood that a network device may be a CU node, a DU node, or a device including a CU node and a DU node. In addition, the CU may be classified as a network device in a radio access network RAN, or the CU may be classified as a network device in a core network CN. This is not limited herein.

The terminal device may also be referred to as UE, an access terminal, a subscriber unit, a subscriber station, a mobile station, a mobile station, a remote station, a remote terminal, a mobile device, a user terminal, a terminal, a wireless communications device, a user agent, or a user apparatus. The terminal device in this embodiment of this application may be a mobile phone, a tablet computer (Pad), a computer with a wireless transceiver function, a virtual reality (VR) terminal device, an augmented reality (AR) terminal device, a wireless terminal in industrial control (industrial control), a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in this embodiment of this application. In this application, a terminal device having a wireless transceiver function and a chip that may be disposed in the foregoing terminal device are collectively referred to as a terminal device.

In the communications system 100, both the network device 102 and the network device 104 may communicate with a plurality of terminal devices (for example, the terminal device 106 shown in the figure). The network device 102 and the network device 104 may communicate with one or more terminal devices similar to the terminal device 106. However, it should be understood that a terminal device communicating with the network device 102 and a terminal device communicating with the network device 104 may be the same or may be different. The terminal device 106 shown in FIG. 1 may simultaneously communicate with the network device 102 and the network device 104, but this shows only a possible scenario. In some scenarios, the terminal device may communicate with only the network device 102 or the network device 104. This is not limited in this application.

It should be understood that FIG. 1 is only a simplified schematic diagram used as an example for ease of understanding. The communications system may further include another network device or terminal device that is not shown in FIG. 1.

With development of a multiple-antenna technology, a plurality of transmit antennas and a plurality of receive antennas may be separately configured for a network device and a terminal device. A quantity of transmit antennas supported by some terminal devices may be less than a quantity of receive antennas supported by the terminal devices, for example, 1T2R (namely, one transmit antenna and two receive antennas), 2T4R (namely, two transmit antennas and four receive antennas), aTbR (a<b), or the like. It may be understood that in an example of 1T2R, the terminal device can transmit an uplink signal/channel through only one antenna at a time, and can simultaneously receive a downlink signal/channel through two antennas. Therefore, when channel state information (CSI) of a downlink channel needs to be obtained based on channel reciprocity, the terminal device may need to send, at different times through different antennas, reference signals used for channel sounding, for example, sounding reference signals (SRS). This manner may be referred to as antenna switching or antenna selection.

Before this embodiment of this application is described, some related concepts in NR are first briefly described.

Antenna port: An antenna port includes at least one of an antenna port of a channel used for uplink data transmission (which is referred to as an uplink data channel for short, for example, a physical uplink shared channel (PUSCH)), an antenna port of a reference signal used for demodulation (which is referred to as a demodulation reference signal for short, for example, a demodulation reference signal (DMRS)), and an antenna port of a reference signal used for channel sounding (which is referred to as a channel sounding reference signal for short, for example, an SRS), and is an antenna port used to carry a specific physical channel and/or physical signal. For signals sent over a same antenna port, regardless of whether the signals are sent over a same physical antenna or different physical antennas, channels corresponding to paths through which the signals pass during spatial transmission may be considered to be the same or related. (For example, large-scale channel properties such as channel matrices H are the same.) In other words, when demodulating the signals sent over the same antenna port, a receive end may consider that the channels corresponding to the signals are the same or related. The antenna port is a logical concept. Generally, the signal receive end identifies, by using antenna ports, signals having different transmission channels.

Antenna: An antenna may also be referred to as a user antenna, a user antenna port, a user port, or the like, and may also be referred to as a transmit antenna or a receive antenna. The antenna may have a correspondence with a feed port of the antenna. The transmit antenna is an antenna port related to a physical transmit antenna. Generally, a physical antenna is an array element of a physical antenna. An antenna is also represented by using a port, but is different from the antenna port carrying the physical channel. The transmit antenna is a physical concept, and may be associated with or not associated with a logical port in design. Different antennas may be distinguished by using different identifiers or indexes.

Generally, a mapping relationship between a logical antenna and a physical antenna depends on how to implement the logical antenna. One or more physical antennas may be weighted to form one logical antenna. Mapping between the logical port and a transmit antenna dipole element of a user may also depend on how the user performs the mapping. The user may number the transmit antenna dipole element, and map the logical port to the transmit antenna dipole element.

A reference signal includes an uplink reference signal and a downlink reference signal. The uplink reference signal is at least one of a reference signal used for uplink channel measurement and the reference signal used for demodulation. The reference signal used for uplink channel measurement may be the SRS, or may be another reference signal having an uplink channel measurement function. The downlink reference signal includes the reference signal used for demodulation, a channel state measurement signal, and the like.

SRS resource set: An SRS resource set may include at least one SRS resource. The SRS resource set may be distinguished by using an identifier of the SRS resource set. One or more SRS resources may be configured in one SRS resource set, and configuration information of one SRS resource may include an identifier of the SRS resource. The one or more SRS resources configured in the SRS resource set may be distinguished by using an identifier of each SRS resource. An identifier of an SRS resource in one SRS resource set may be numbered in the SRS resource set (in other words, identifiers of SRS resources in different SRS resource sets may be the same, the identifiers of the SRS resources are specific to each SRS resource set, and SRS resources represented by SRS resources with a same identifier in a plurality of SRS resource sets are different). Alternatively, an identifier of an SRS resource in one SRS resource set may be numbered for one terminal device (in other words, identifiers of SRS resources in different SRS resource sets may be different, or SRS resources represented by SRS resources with a same identifier in a plurality of SRS resource sets are the same). Alternatively, an identifier of an SRS resource in an SRS resource set may be numbered in a cell (in other words, different terminal devices in a cell may share a number of SRS resources, and SRS resources with a same SRS identifier for different terminal devices are the same). A usage of an SRS resource set may be configured. It may be considered that the usage is related to a transmission characteristic, and an optional usage includes one or more of beam management, antenna switching, codebook-based uplink transmission, non-codebook-based uplink transmission, codebook-based uplink antenna selection transmission, and non-codebook-based uplink antenna selection transmission. A possible application scenario is as follows: Different SRS resource sets are used for different measurement purposes. For example, one resource set is used to measure a large-scale property of a channel, for example, measure a large-scale property of a beam level, and may be used for mobility management, and another resource set is used to measure a small-scale property of a channel, for example, channel quality. Different SRS resources in one SRS resource set are used to measure different channels, for example, different beams or space domains. Different ports of one SRS resource may be used to support channels of a plurality of layers in a multiple-input multiple-output (MIMO) scenario.

When the SRS resource set is configured for the beam management function, at least one of transmit beams or receive beams of at least two SRS resources in the SRS resource set are different.

When the SRS resource set is configured for the antenna switching function, SRS transmit antennas of at least two SRS resources in the SRS resource set are not completely the same.

When the SRS resource set is configured for the codebook-based uplink transmission function, the SRS resource set may be used to indicate information about a precoding matrix in a codebook.

When the SRS resource set is configured for the non-codebook-based uplink transmission function, the SRS resource set may be used to indicate weight information of at least one of a precoder and a spatial transmission filter.

When the SRS resource set is configured for the codebook-based uplink antenna selection transmission function, the SRS resource set may be used to indicate an antenna and information about a precoding matrix in a codebook.

When the SRS resource set is configured for the non-codebook-based uplink antenna selection transmission function, the SRS resource set may be used to indicate an antenna, and weight information of at least one of a precoder or a spatial transmission filter.

Further, generally, the terminal device does not expect to receive a quantity of different antenna ports configured for each SRS resource in an SRS resource set, or the terminal device does not expect to receive values of different pieces of bandwidth configured for each SRS resource in the SRS resource set.

Quantity of antenna ports of the PUSCH: A quantity of antenna ports of the PUSCH may be determined, in codebook-based transmission (including a case in which there is no antenna selection and a case in which there is antenna selection), based on a quantity of SRS antenna ports configured for an indicated SRS resource; or may be determined, in non-codebook-based transmission (including a case in which there is no antenna selection and a case in which there is antenna selection), based on a quantity of SRS resources in the indicated SRS resource set, or based on a total quantity of SRS resources in the configured SRS resource set.

Weight information: Weight information is used to weight reference signals sent over a plurality of antennas (logically or physically) in the multiple-antenna technology. The weight enables transmitted or received signals to have an energy distribution characteristic in space, for example, reflect energy aggregation in some directions. Adjusting the weight, to implement a directional effect of the signals, may also be referred to as precoding or beamforming.

Generally, digital weight information through which an operation is performed on a baseband may be identified by using the precoding matrix, the precoder, or the like. A weight formed by adjusting a phase of a phase shifter connected to a physical antenna may be considered as an analog weight, and may also be referred to as a spatial transmission filter. Generally, a digital weight and the analog weight may be interchangeably used. For example, a digital weight matrix is first applied to the baseband, and then an analog weight matrix is applied to a radio frequency. Therefore, there is no strict technical distinction between the precoding matrix, the precoder, the spatial transmission filter, and the like.

In addition, the weight is applied to the antenna and/or the antenna port in a function manner. For example, the function may be multiplication. This means that the weight, as a matrix, may be multiplied by a signal on the antenna and/or the antenna port. Specifically, for example, when the weight is the precoding matrix, the precoding matrix may be multiplied by a vector formed by data streams carried on the DMRS antenna port, to precode the data streams, thereby reducing inter-stream interference, and improving a system gain. For another example, the analog weight formed for sent signals by adjusting the phase of the phase shifter connected to the antenna is also a mathematical effect of performing multiplication and weighting on the physical antenna.

When the weight information is the information about the precoding matrix, the terminal device obtains information about an uplink precoding matrix in the following process: The network device configures one or more SRS resources for the terminal device, and configures a quantity of antenna ports corresponding to an SRS resource, for example, 1, 2, or 4. This indicates a quantity of antenna ports used by the SRS resource for transmission. Optionally, an antenna port of the SRS resource is an antenna port that corresponds to the quantity of corresponding configured antenna ports and that is selected from a least significant bit of selectable SRS antenna ports. For example, when the quantity of configured antenna ports of the SRS resource is 4, and the least significant bit of the antenna ports that are selectable for the SRS resource is 3000, antenna ports of the SRS resource are 3000, 3001, 3002, and 3003. Optionally, configuration information of the SRS resource may include specific information about the SRS antenna ports, for example, the antenna ports 3000 and 3003. The network device indicates an SRS resource in downlink control information (downlink control information, DCI). The terminal device obtains, based on the indication of the SRS resource, a quantity of SRS antenna ports of the indicated SRS resource, and determines a quantity of antenna ports of the PUSCH. Generally, in the codebook-based transmission, the quantity of antenna ports of the PUSCH is equal to the quantity of SRS antenna ports of the indicated SRS resource. There is a correspondence between the quantity of antenna ports and a precoding indication information field. The terminal device determines an indicated precoding matrix based on the quantity of antenna ports and the precoding indication information field (including precoding information and a number of layers) that is in the DCI. Specifically, the terminal device determines, based on the quantity of ports (port), a table to be used, and determines, based on a value of the precoding indication information field in the DCI, a precoding matrix (index) in the table to be used, to determine the corresponding precoding matrix. In addition, an uplink rank is further indicated in the precoding matrix indication information field. The uplink rank reflects a quantity of independent data streams of uplink data and is related to an antenna correlation of a channel. A higher antenna correlation of the channel indicates a lower rank, or a lower antenna correlation of the channel indicates a higher rank.

Further, the precoding indication information field (including the precoding information and the number of layers) in the DCI is used to indicate an uplink transport layer (namely, an uplink rank) and the information about the precoding matrix.

When the weight information is the precoder, the spatial transmission filter, or the like, the terminal device obtains the weight information in the following process: The terminal device may send at least one SRS resource based on a configuration of the network device. One SRS resource corresponds to one piece of weight information (to be specific, there is a correspondence between the SRS resource and the weight information), each SRS resource may include one SRS antenna port, and the SRS resource is sent by using the weight information. After receiving the at least one SRS resource, the network device may measure the at least one SRS resource. The network device schedules, for the terminal device, an SRS resource that the network device considers to be relatively good. The network device indicates SRS resource indication information to the terminal device. The indication information may be carried by using higher layer signaling or physical layer signaling, for example, carried by using DCI. The terminal device performs a weighting (precoding, beamforming, or the like) operation on the PUSCH based on the SRS resource indication information indicated by the network device and by using the weight information corresponding to the SRS resource.

A relationship between the weight information and the logical antenna or the physical antenna is described as follows: Different physical antennas may correspond to a same logical antenna, but channels of the different physical antennas may be different. Therefore, appropriate weight information obtained through measurement by the network device may be different. Therefore, it may be considered that there is a correspondence between the weight information indicated by the network device and a transmit antenna that is of the terminal device and that is indicated by the network device. Generally, the network device may determine, through measurement and based on a channel through which an uplink sounding signal passes, weight information corresponding to uplink transmission data. Channels corresponding to the uplink sounding signal sent through different antennas are different. Therefore, for different physical antennas, the network device may determine different weight information through measurement. The weight information, for example, the precoding matrix, is usually used to weight the logical antenna. The precoder, the spatial transmission filter, and the like are used to weight the antenna and/or the logical antenna.

A usage of the SRS resource/SRS resource set is described as follows: There is a correspondence between the usage of the SRS resource/SRS resource set and the transmission characteristic of the SRS resource/SRS resource set. For example, when the usage is to perform the beam management, at least two SRS resources in the SRS resource set may correspond to different transmit beams (namely, different spatial transmission filters) or different receive beams (namely, different receive spatial filters or receive non-quasi co-locations). When the usage is to perform the SRS antenna switching, at least two SRS resources in the SRS resource set are switched and sent on different antennas.

That two antenna ports have a quasi-colocation (quasi co-located, QCL) relationship means that a channel large-scale parameter of one antenna port may be inferred (infer) based on an obtained (conveyed) channel large-scale parameter of the other antenna port. The large-scale parameter may include one or more of an average gain (average gain), an average delay (average delay), a delay spread (delay spread), a Doppler frequency shift (Doppler shift), a Doppler spread (Doppler spread), and a spatial parameter (spatial parameter, or spatial Rx parameters).

The spatial parameter may include one or more of an angle of arrival (AoA), a dominant angle of arrival (dominant AoA), an average angle of arrival (average AoA), an angle of departure (AoD), a channel correlation matrix, a power angle spread spectrum of the angle of arrival, an average angle of departure (average AoD), a power angle spread spectrum of the angle of departure, a transmit channel correlation, a receive channel correlation, transmit beamforming, receive beamforming, a spatial channel correlation, a spatial filter or a spatial filtering parameter or a spatial reception parameter or the weight information, and the like.

The following describes in detail the embodiments of this application with reference to the accompanying drawings.

It should be understood that the technical solutions in this application may be applied to a wireless communications system, for example, the communications system 100 shown in FIG. 1. The communications system may include at least one network device and at least one terminal device, and the network device and the terminal device may communicate with each other through a wireless air interface. For example, the network device in the communications system may correspond to the network device 102 and the network device 106 shown in FIG. 1, and the terminal device may correspond to the terminal device 104 shown in FIG. 1.

It should be further understood that, in this embodiment of this application, for ease of understanding, the technical solutions are described by using the PUSCH as an example, but this should not constitute any limitation on this application. The method provided in this application is not only applicable to PUSCH transmission, but also applicable to transmission of another uplink data channel/signal. In addition, a reference signal used for channel measurement is not limited in this application. The reference signal may be a demodulation reference signal, a phase noise reference signal, or another reference signal used to implement a same or similar function.

Without loss of generality, the following describes the embodiments of this application in detail by using an interaction process between a terminal device and a network device as an example. The terminal device may be a terminal device that is in a wireless communications system and that has a wireless connection relationship with the network device. It may be understood that the network device and a plurality of terminal devices that are in the wireless communications system and that have the wireless connection relationship may transmit a reference signal based on same technical solutions. This is not limited in this application.

Figure 2:
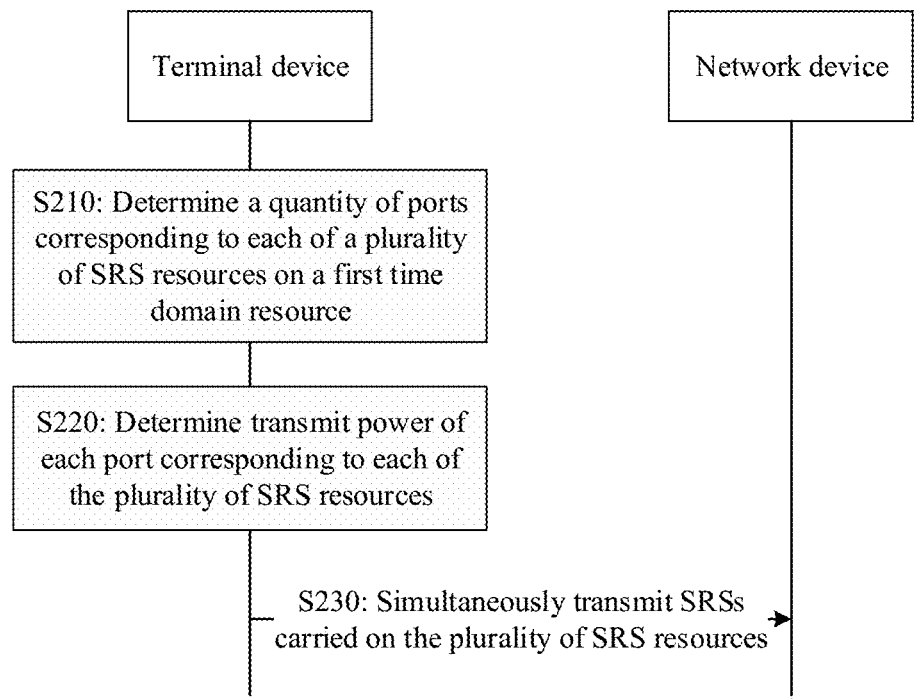
FIG. 2 is a schematic flowchart of a sounding reference signal transmission method according to this application.

FIG. 2 is a schematic flowchart of a sounding reference signal transmission method 200 according to an embodiment of this application from the perspective of device interaction. As shown in FIG. 2, the method 200 may include the following steps.

S210: Determine a quantity of ports corresponding to each of a plurality of SRS resources on a first time domain resource, where the plurality of SRS resources belong to a first SRS resource set.

S220: Determine, based on the quantity of ports corresponding to each of the plurality of SRS resources and transmit power corresponding, in a first time unit, to the first SRS resource set, transmit power of each port corresponding to each of the plurality of SRS resources, where a sum of transmit power of all ports corresponding to the plurality of SRS resources is less than or equal to transmit power corresponding to the first SRS resource set, and the first time unit includes the first time domain resource, or the first time unit is the first time domain resource.

Optionally, in S230, SRSs carried in the plurality of SRS resources are simultaneously transmitted on the first time domain resource based on the transmit power of each port corresponding to each of the plurality of SRS resources.

Optionally, in S230', power headroom of SRSs, for example, power headroom of simultaneously transmitted SRSs carried in the plurality of SRS resources, is obtained based on the transmit power of each port corresponding to each of the plurality of SRS resources.

S230": Send, to the network device, information indicating the power headroom.

The steps in the method 200 may be performed by, for example, the terminal device. The first time domain resource is, for example, a symbol (symbol), and the first time domain resource may also be referred to as a transmission period. The first time unit is, for example, a subframe, one or more symbols, or one or more slots. One SRS resource set includes at least one SRS resource, and one SRS resource may include a port and a symbol. In S230, "simultaneous" transmission is performed, for example, on a same symbol.

In this application, transmit power (which may also be referred to as a theoretical value of the transmit power, and when total transmit power in a time unit exceeds a threshold, final transmit power of an SRS resource set in the time unit may be adjusted based on the theoretical value of the transmit power) of the SRS resource set in the time unit may be determined in a manner in the prior art, or may be determined in a future evolution manner. This is not limited in this application.

For example, the transmit power of the SRS resource set in the time unit may be determined based on an open-loop power value P0 (which is also referred to as reference power density), a path loss coefficient $\alpha$, a path loss corresponding to the SRS resource set, and a closed-loop power adjustment value h that are of the SRS resource set corresponding to the SRSs. For example, the transmit power of the SRS resource set may be determined in the following manner:

When transmitting an SRS in a carrier f of a cell c in an SRS power control adjustment state with an index l, the terminal device determines transmit power $P_{SRS,f,c}(i,q_s,l)$ in one SRS transmission period i (for example, one time unit) as follows:

$$P_{SRS,f,c}(i, q_s, l) = \min \begin{Bmatrix} P_{CMAX,f,c}(i), \\ P_{O\_SRS,f,c}(q_s) + 10\log_{10}(2^\mu \cdot M_{SRS,f,c}(i)) + \alpha_{SRS,f,c}(q_s) \cdot PL_{f,c}(q_s) + h_{f,c}(i, l) \end{Bmatrix} [dBm], \quad (1)$$

where $P_{CMAX,f,c}(i)$ is maximum transmit power configured for the terminal device in the carrier f in the cell c in the SRS transmission period i, where reference may be made to descriptions in the prior art for the parameter, for example, in the protocol TS 38.101; $P_{O\_SRS,f,c}(q_s)$ is reference power density corresponding, in the carrier f of the cell c, to an SRS resource set $q_s$, may also be referred to as nominal power, and physically means power density of a signal that a receive end expects to receive, where the power density is density that power has in frequency domain, and may be configured by using a higher layer parameter p0-srs; $M_{SRS,f,c}(i)$ is SRS sending bandwidth in the carrier f of the cell c in the SRS transmission period i, where reference may be made to descriptions in the prior art, for example, descriptions in the protocol TS 38.211, for a specific meaning of the parameter; $\alpha_{SRS,f,c}(q_s)$ is a path loss coefficient (which is also referred to as a path loss compensation factor) corresponding, in the carrier f of the cell c, to the SRS resource set $q_s$, and may be configured by using a higher-layer parameter alpha-srs; $PL_{f,c}(q_s)$ is a path loss that the SRS resource set $q_s$ has in the carrier f of the cell c, where optionally, the path loss may be considered as a generalized path loss, may be understood as a path loss, a coupling loss, or the like, represents a large-scale loss that a signal has when the signal is transmitted on a link between the network device and the terminal device, and may be configured by using a higher-layer parameter srs-pathlossReference-rs, where reference may be made to a manner in the prior art, in the protocol TS 38.214, for a specific manner; and $h_{f,c}(i,l)$ may represent a closed-loop power control adjustment amount in the carrier f of the cell c in the SRS transmission period i in the SRS power control adjustment state with the index l.

It may be understood that, when the carrier f of the cell c is not emphasized in the description of this application, application of this application may not be limited to the cell c or the carrier f.

In this application, "a plurality of" means two or more. The first SRS resource set, the first time unit, and the first SRS resource set are merely examples for description, and are not intended to limit this application.

The quantity of ports corresponding to each of the plurality of SRS resources on the first time domain resource may be the same, or may be different. After determining the quantity of ports corresponding to each SRS resource, the terminal device may determine the transmit power of each port based on a total quantity of ports. For example, when the total quantity of ports corresponding to the plurality of SRS resources exceeds a quantity threshold, the terminal device determines that the transmit power of each port is a relatively small value. When the total quantity of ports corresponding to the plurality of SRS resources is less than the quantity threshold, the terminal device determines that the transmit power of each port is a relatively large value. Therefore, it can be ensured that the sum of transmit power of all ports corresponding to the plurality of SRS resources is not greater than the transmit power corresponding to the first SRS resource set, thereby avoiding a communication fault caused because the sum of transmit power of all ports corresponding to the plurality of SRS resources exceeds the transmit power corresponding to the first SRS resource set.

In an optional implementation, the transmit power of each port corresponding to each of the plurality of SRS resources on the first time domain resource is equal, and may be determined based on a ratio of the transmit power corresponding, in the first time unit, to the first SRS resource set to a quantity of all ports corresponding to the plurality of SRS resources in the first time unit. The following is an example of a formula for calculating the transmit power of each port.

$$P_{SRS,p,resource} = \frac{\beta}{N_{ap,total}} P_{SRS,set}, \quad (2)$$

where $N_{ap,total}$ is a sum of quantities of ports included in J SRS resources for simultaneously transmitting SRSs, that is, $$N_{ap,total} = \sum_{j=0}^{J-1} N_{ap,j},$$

where $N_{ap,j}$ is a total quantity of ports corresponding to a jth SRS resource; $P_{SRS,set}$ is total SRS transmit power corresponding, in a time unit, to a resource set to which the J SRS resources belong; and $\beta$ is a scale factor, and is used to ensure that power for simultaneously sending the SRSs does not exceed the total SRS transmit power corresponding, in the time unit, to the resource set to which the SRS resources belong.

In the foregoing embodiment, allocating same power to a plurality of ports corresponding to a same SRS resource set can reduce a work burden of the receive end. This is because when transmit power of the plurality of ports is the same, the receive end needs to determine quality of a transmission resource (such as a beam) only based on receive power, and does not need to consider the transmit power.

In another optional embodiment, S220 includes the following steps:

S221: Determine, based on a quantity of the plurality of SRS resources on the first time domain resource and the transmit power corresponding, in the first time unit, to the first SRS resource set, transmit power corresponding to each of the plurality of SRS resources, where the transmit power corresponding to each of the plurality of SRS resources is equal, and a sum of transmit power corresponding to all of the plurality of SRS resources is less than or equal to the transmit power corresponding, in the first time unit, to the first SRS resource set.

S222: Determine, based on the transmit power corresponding to each of the plurality of SRS resources on the first time domain resource and the quantity of ports corresponding to each of the plurality of SRS resources, the transmit power of each port corresponding to each of the plurality of SRS resources, where a sum of transmit power of all ports corresponding to any one of the plurality of SRS resources is less than or equal to transmit power corresponding to any one SRS resource.

A power allocation criterion in this embodiment is to ensure that total power of an SRS resource set is equally allocated to each of a plurality of SRS resources for simultaneously sending the SRSs, and total power corresponding to each SRS resource is equally allocated to a plurality of ports in the SRS resource. The following is an example of a formula for calculating the transmit power of each port.

$$P_{SRS,p,j} = \frac{\beta}{J \cdot N_{ap,j}} P_{SRS,set}, \quad (3)$$

where the terminal device simultaneously transmits SRSs on J SRS resources, a total quantity of ports corresponding to a jth SRS resource is $N_{ap,j}$, $P_{SPS,set}$ is total SRS transmit power corresponding, in a time unit, to a resource set to which the SRS resources belong, and $\beta$ is a scale factor, and is used to ensure that power for simultaneously sending the SRSs does not exceed the total SRS transmit power corresponding, in the time unit, to the resource set to which the J SRS resources belong.

Different SRS resource sets may be used to measure different physical quantities. In the foregoing embodiment, first, the transmit power corresponding to the first SRS resource set is evenly allocated to all SRS resources in the first SRS resource set, and then a next step is to allocate the power based on the quantity of ports corresponding to each SRS resource, thereby ensuring fairness of measuring the different physical quantities by the receive end based on all the SRS resources in the first SRS resource set.

Figure 3:
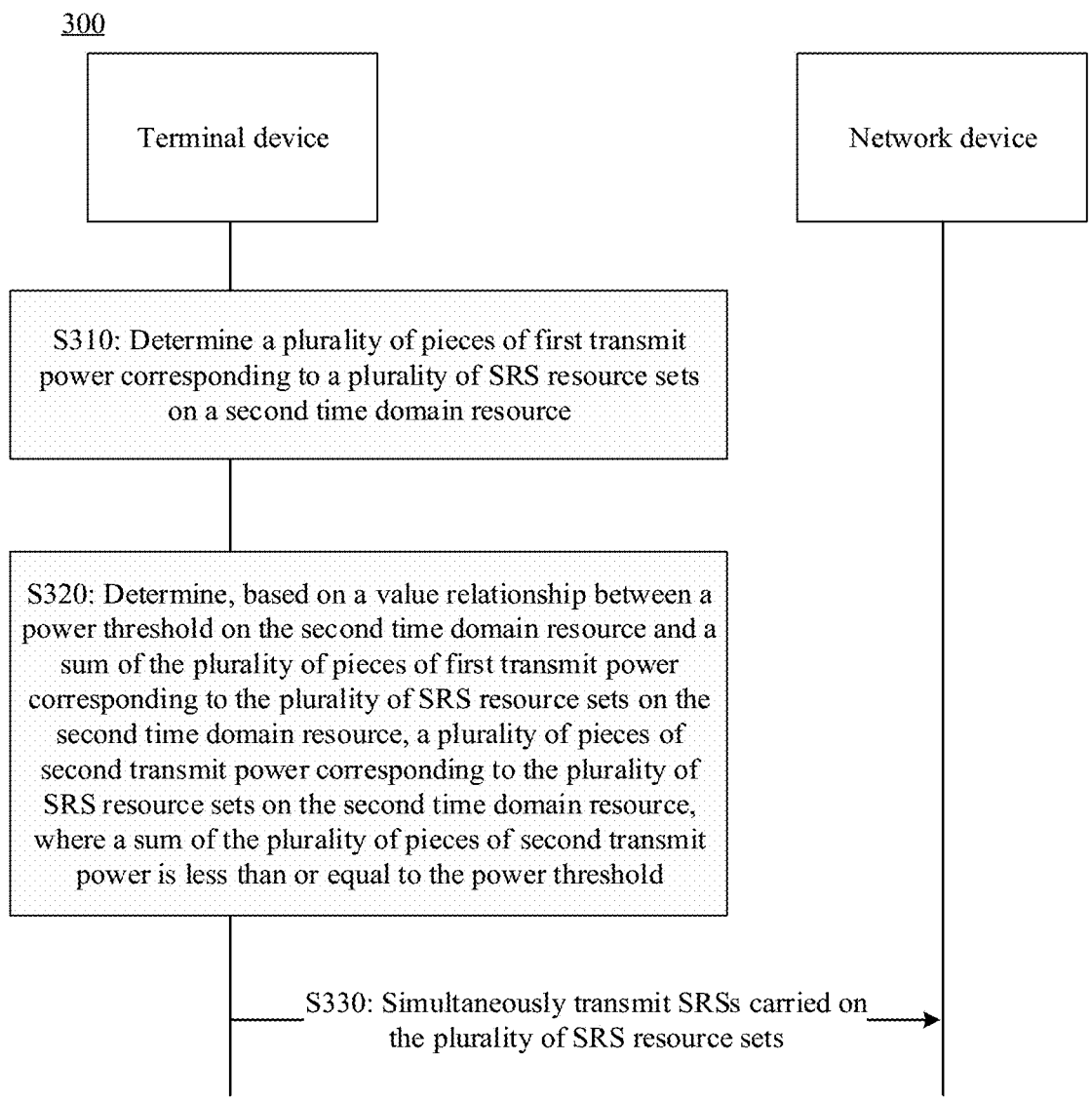
FIG. 3 is a schematic flowchart of another sounding reference signal transmission method according to this application.

FIG. 3 is a schematic flowchart of a sounding reference signal transmission method 300 according to an embodiment of this application from the perspective of device interaction. As shown in FIG. 3, the method 300 may include the following steps.

S310: Determine a plurality of pieces of first transmit power corresponding to a plurality of SRS resource sets on a second time domain resource, where the plurality of SRS resource sets are in a one-to-one correspondence with the plurality of pieces of first transmit power.

S320: Determine, based on a value relationship between a power threshold on the second time domain resource and a sum of the plurality of pieces of first transmit power corresponding to the plurality of SRS resource sets on the second time domain resource, a plurality of pieces of second transmit power corresponding to the plurality of SRS resource sets on the second time domain resource, where a sum of the plurality of pieces of second transmit power is less than or equal to the power threshold, and the plurality of pieces of second transmit power are in a one-to-one correspondence with the plurality of SRS resource sets.

S330: Simultaneously transmit, on the second time domain resource based on the plurality of pieces of second transmit power, SRSs carried in the plurality of SRS resource sets.

An execution device of the method 300 is, for example, a terminal device, and the first transmit power may be determined according to formula (1). The second transmit power may be equal to the first transmit power, or may be unequal to the first transmit power. The second time domain resource is, for example, a symbol or a slot. One SRS resource set includes at least one SRS resource, and one SRS resource may include at least one port and at least one symbol (one time domain resource or one time unit). In S330, "simultaneous" transmission is performed, for example, on a same symbol.

Each SRS resource set corresponds to a piece of first transmit power. When the plurality of SRS resource sets are simultaneously transmitted, the second transmit power corresponding to the plurality of SRS resource sets may be determined based on the value relationship between the sum of the first transmit power of the plurality of SRS resource sets and the power threshold. For example, when the sum of the first transmit power of the plurality of SRS resource sets is greater than the power threshold, one or more pieces of first transmit power of one or more of the plurality of SRS resource sets may be reduced. Optionally, SRSs may not be sent on the one or more SRS resource sets. When the sum of the plurality of pieces of first transmit power of the plurality of SRS resource sets is less than or equal to the power threshold, the plurality of pieces of first transmit power of the plurality of SRS resource sets may not be adjusted, or the plurality of pieces of second transmit power of the plurality of SRS resource sets are determined to be respectively equal to the plurality of pieces of first transmit power of the plurality of SRS resource sets. Therefore, it can be ensured that the sum of the plurality of pieces of second transmit power is less than or equal to the power threshold, to avoid a communication fault caused when the plurality of SRS are transmitted on a time domain resource (such as a symbol) based on the first transmit power of the plurality of SRS resource sets and because the sum of the first power of the plurality of SRS resource sets exceeds maximum transmit power of the time domain resource.

In an optional embodiment, S320 includes the following steps:

S321: Determine at least one power adjustment factor based on the value relationship between the power threshold on the second time domain resource and the sum of the plurality of pieces of first transmit power corresponding to the plurality of SRS resource sets on the second time domain resource, where the at least one power adjustment factor is a value greater than or equal to 0.

S322: Determine, based on the at least one power adjustment factor and the plurality of pieces of first transmit power corresponding to the plurality of SRS resource sets on the second time domain resource, the plurality of pieces of second transmit power, where the plurality of SRS resource sets include a second SRS resource set, the at least one power adjustment factor includes a first power adjustment factor, and second transmit power corresponding to the second SRS resource set is equal to a product of the first power adjustment factor and first transmit power corresponding to the second SRS resource set.

A plurality of power adjustment factors may be preconfigured, and the at least one power adjustment factor is determined based on the value relationship between the power threshold and the sum of the plurality of pieces of first transmit power. For example, when the sum of the plurality of pieces of first transmit power is greater than the power threshold, a larger difference indicates a smaller value of the power adjustment factor determined from the plurality of power adjustment factors, or a smaller difference indicates a larger value of the power adjustment factor determined from the plurality of power adjustment factors. Therefore, the second transmit power of the plurality of SRS resource sets may be flexibly adjusted when the sum of the plurality of pieces of first transmit power is ensured to not exceed the power threshold.

In the foregoing embodiment, one power adjustment factor may be used to adjust the first transmit power of the plurality of SRS resources, or a plurality of power adjustment factors may be used to separately adjust the first transmit power of the plurality of SRS resources. A quantity of the plurality of power adjustment factors may be equal to a quantity of the plurality of SRS resources, or a quantity of the plurality of power adjustment factors may alternatively be less than a quantity of the plurality of SRS resources.

In the foregoing embodiment, when the sum of the plurality of pieces of first transmit power is greater than the power threshold, any one of the at least one power adjustment factor is a value less than 1. When the sum of the plurality of pieces of first transmit power is equal to the power threshold, any one of the at least one power adjustment factor is a value less than or equal to 1. When the sum of the plurality of pieces of first transmit power is less than the power threshold, any one of the at least one power adjustment factor may be a value less than or equal to or greater than 1. To be specific, when the sum of the plurality of pieces of first transmit power is less than the power threshold, when it is ensured that the sum of the plurality of pieces of second transmit power is not greater than the power threshold, any one of the plurality of pieces of first transmit power may be decreased or not adjusted or increased by selection.

Optionally, S321 includes the following steps:

S3211: Determine the at least one power adjustment factor when the power threshold on the second time domain resource is less than the sum of the plurality of pieces of first transmit power corresponding to the plurality of SRS resource sets on the second time domain resource.

When the sum of the plurality of pieces of first transmit power is greater than the power threshold, the terminal device adjusts the first transmit power based on the power adjustment factor. When the sum of the plurality of pieces of first transmit power is not greater than the power threshold, the terminal device does not need to determine the power adjustment factor, and does not need to adjust the plurality of pieces of first transmit power, thereby reducing a burden of the terminal device.

Optionally, S321 includes the following steps:

S3212: Determine one power adjustment factor based on the value relationship between the power threshold on the second time domain resource and the sum of the plurality of pieces of first transmit power corresponding to the plurality of SRS resource sets on the second time domain resource, where when the sum of the plurality of pieces of first transmit power is greater than the power threshold, the power adjustment factor is less than or equal to a value obtained through dividing the power threshold by the sum of the plurality of pieces of first transmit power.

The value obtained through dividing the power threshold by the sum of the plurality of pieces of first transmit power may be used as the power adjustment factor. For example, if the power threshold is 100, and the sum of the plurality of pieces of first transmit power is 200, the power adjustment factor may be 0.5. To be specific, each first transmit power is reduced by half Therefore, the first power of each SRS resource set may be reduced proportionally, thereby ensuring fairness of allocating transmit power to each SRS resource set.

Figure 4:
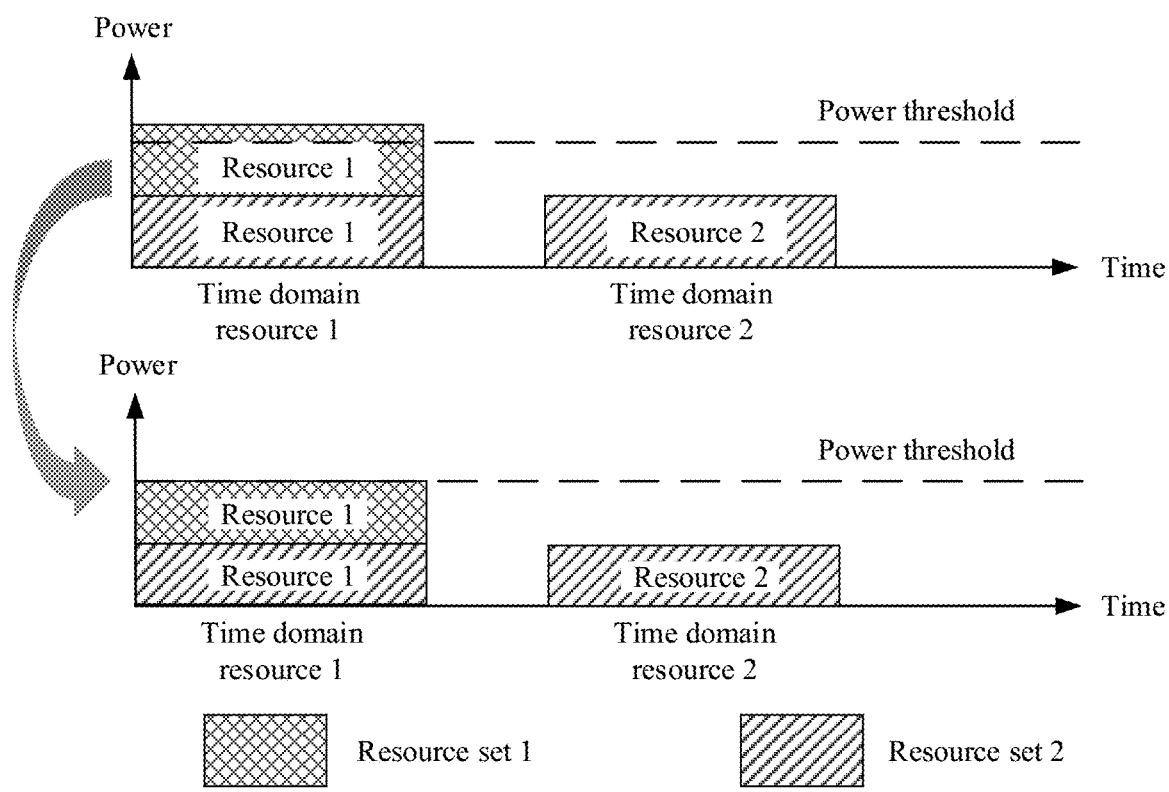
FIG. 4 is a schematic diagram of a method for adjusting first power of a plurality of SRS resource sets according to this application.

FIG. 4 is a schematic diagram of a method for adjusting the first transmit power of the plurality of SRS resource sets according to this application.

As shown in FIG. 4, a resource set 1 and a resource set 2 are two SRS resource sets corresponding to a same time domain resource. The resource set 1 includes one resource, and the resource set 2 includes two resources. In one time domain resource, each resource set has only one resource used to send an SRS. In a time domain resource 1, a sum of first transmit power corresponding to a resource 1 in the resource set 1 and first transmit power corresponding to a resource 1 in the resource set 2 is greater than a power threshold of the time domain resource 1. Therefore, the first transmit power of the two resources on the time domain resource 1 needs to be reduced. The sum of the first transmit power of the two resources on the time domain resource 1 may be reduced according to formula (4).

$$\sum_{k=0}^{K-1} \omega \cdot P_{SRS,k} \le P_{max}, \tag{4}$$

where

K is a quantity of SRS resource sets used to simultaneously transmit SRSs, $P_{SRS,k}$ is first transmit power corresponding to a kth SRS resource set, and $\omega$ is a power adjustment factor, and is used to ensure that second transmit power corresponding to a plurality of SRS resource sets used to simultaneously send the SRSs does not exceed a power threshold $P_{max}$.

For example, different resources in an SRS resource set have different multiplexing statuses with other uplink channels, but transmit power used by the different resources should be the same as transmit power of the first resource that is used to transmit an SRS and that is in the SRS resource set. (For example, transmit power of a resource 2 and transmit power of an adjusted resource 1 in a same resource set are the same.)

For another example, when the first resource in an SRS resource set is multiplexed with another uplink channel, if the terminal device chooses to drop, to be specific, does not transmit an SRS on the first resource in the SRS resource set, the terminal device drops all subsequent resources in the SRS resource set. In other words, the subsequent resources in the SRS resource set are no longer used to transmit the SRSs.

In FIG. 4, an image in an upper part represents first transmit power corresponding to the resource set 1 and first transmit power corresponding to the resource set 2, an image in a lower part represents second transmit power corresponding to the resource set 1 and second transmit power corresponding to the resource set 2, and an arrow represents adjusting, according to formula (4), the first transmit power corresponding to the resource set 1 and the first transmit power corresponding to the resource set 2.

Optionally, the plurality of SRS resource sets on the second time domain resource include a third SRS resource set and the second SRS resource set, SRS transmission of the second SRS resource set on the second time domain resource is initial transmission, and SRSs in the third SRS resource set are initially transmitted on a third time domain resource before the second time domain resource. S321 includes the following step:

S3213: When the sum of the plurality of pieces of first transmit power on the second time domain resource is greater than the power threshold on the second time domain resource, determine that second transmit power corresponding to the third SRS resource set is equal to second transmit power of the third SRS resource set on the third time domain resource, and determine that a power adjustment factor corresponding to the second SRS resource set is a value less than 1.

If the initial SRS transmission corresponding to the third SRS resource set is prior to the initial SRS transmission corresponding to the second SRS resource set, second transmit power of the third SRS resource set on the second time domain resource is the same as the second transmit power of the third SRS resource set on the third time domain resource, that is, a power adjustment factor of the third SRS resource set on the second time domain resource is the same as that of the third SRS resource set on the third time domain resource, thereby ensuring fairness of allocating the power to each SRS resource in the third SRS resource set.

Figure 5:
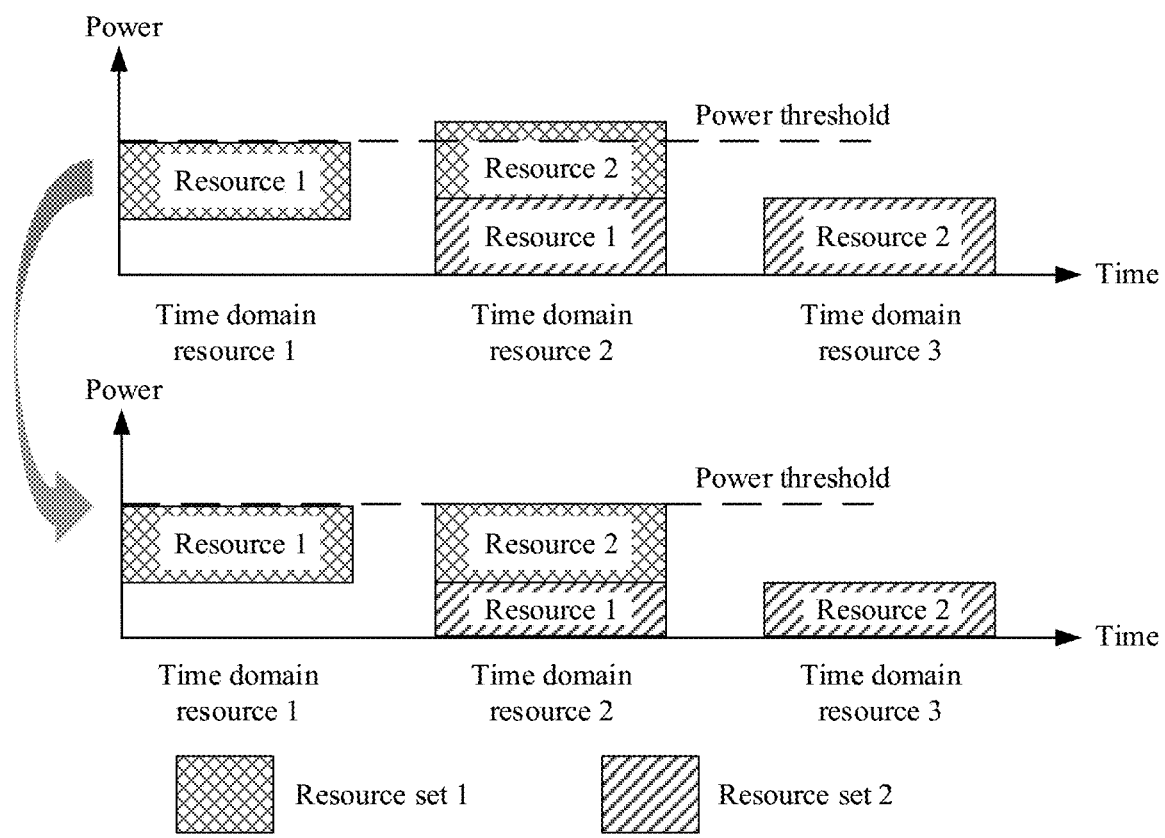
FIG. 5 is a schematic diagram of another method for adjusting first transmit power of a plurality of SRS resource sets according to this application.

FIG. 5 is a schematic diagram of another method for adjusting the first transmit power of the plurality of SRS resource sets according to this application.

As shown in FIG. 5, a resource set 1 and a resource set 2 are two SRS resource sets corresponding to a same time domain resource. The resource set 1 includes two resources, and the resource set 2 includes two resources. In one time domain resource, each resource set has only one resource used to send an SRS. In a time domain resource 2, a sum of first transmit power corresponding to a resource 1 in the resource set 1 and first transmit power corresponding to a resource 2 in the resource set 2 is greater than a power threshold of the time domain resource 2. Therefore, the first transmit power of the two resources on the time domain resource 2 needs to be reduced. The sum of the first transmit power of the two resources on the time domain resource 2 may be reduced according to formula (5).

$$\omega \cdot P_{SRS,k_2} \leq P_{max} - P_{SRS,k_1}, \quad (5),$$

where $P_{SRS,k_1}$ is transmit power corresponding to an SRS resource set used for "prior transmission" (that is, the resource set 1), where the transmit power may be first transmit power or may be second transmit power, and depends on transmit power of an SRS resource that has an initial transmission and that is in the SRS resource set used for the "prior transmission", and if the transmit power of the SRS resource that has the initial transmission is the first transmit power (that is, in a case in which no adjustment is performed), $P_{SRS,k_1}$ is the first transmit power of the SRS resource set used for the "prior transmission", or if the transmit power of the SRS resource that has the initial transmission is the second transmit power, $P_{SRS,k_1}$ is the second transmit power of the SRS resource set used for the "prior transmission"; $P_{SRS,k_2}$ is second transmit power corresponding to an SRS resource set (that is, the resource set 2) used for "post transmission"; and ω is a power adjustment factor, and is used to ensure that second transmit power corresponding to a plurality of SRS resource sets used for simultaneously sending SRSs does not exceed a power threshold $P_{max}$.

In FIG. 5, an image in an upper part represents first transmit power corresponding to the resource set 1 and first transmit power corresponding to the resource set 2, an image in a lower part represents second transmit power corresponding to the resource set 1 and second transmit power corresponding to the resource set 2, and an arrow represents adjusting, according to formula (5), the first transmit power corresponding to the resource set 1 and the first transmit power corresponding to the resource set 2.

FIG. 5 shows a case in which each SRS resource set in one time domain resource has only one resource used to send the SRS. If each SRS resource set in the time domain resource may have a plurality of resources used to send SRSs, second transmit power corresponding to an SRS resource set may be allocated, according to the method 300, to a plurality of resources that belong to the same SRS resource set in the time domain resource, or second transmit power corresponding to the SRS resource set may be allocated according to another method.

It should be understood that, in the method 300, transmit power (first transmit power or second transmit power) of a plurality of SRS resources that belong to an SRS resource set should be equal to transmit power corresponding to the first resource that is used to transmit the SRS and that is in the SRS resource set, thereby reducing work burden of a communications device that receives the SRS.

Optionally, in an optional embodiment, S320 includes the following step:

S323: When the sum of the plurality of pieces of first transmit power corresponding to the plurality of SRS resource sets on the second time domain resource is greater than the power threshold on the second time domain resource, determine, based on a priority of each of the plurality of SRS resource sets, that second transmit power of at least one of the plurality of SRS resource sets is 0, where the priority is used to indicate a sequence in which second transmit power of each of the plurality of SRS resource sets is set to 0, an SRS resource set in the plurality of SRS resource sets other than the at least one SRS resource set is a remaining SRS resource set, a sum of first transmit power of the remaining SRS resource set is less than or equal to the power threshold on the second time domain resource, and second transmit power of the remaining SRS resource set is equal to the first transmit power of the remaining SRS resource set.

When the sum of the first transmit power corresponding to the plurality of SRS resource sets is greater than the power threshold, the second transmit power of the at least one of the plurality of SRS resource sets may be set to 0 based on the priority, and a drop operation is performed. For example, there are four SRS resource sets on the second time domain resource, if a sum of first transmit power of the four SRS resource sets is greater than the power threshold corresponding to the second time domain resource set, second transmit power of one, two, or three of the SRS resource sets may be set to 0 based on the priority, to avoid a communication fault caused when a plurality of SRSs are transmitted on a time domain resource (such as a symbol) based on the first transmit power of the plurality of SRS resource sets and because the sum of the first power of the plurality of SRS resource sets exceeds maximum transmit power of the time domain resource.

It should be understood that the method in S323 and the method in S321 may be used independently or in combination. For example, the terminal device simultaneously transmits a plurality of SRSs on three SRS resource sets corresponding to a same time domain resource. For the three SRS resource sets, a drop solution may be performed on one of the SRS resource sets according to the solution described in S323. If a sum of first transmit power corresponding to remaining two SRS resource sets is greater than a power threshold of the time domain resource, a power adjustment factor may be determined according to the method described in S321, and the first transmit power of the remaining two SRS resource sets is adjusted based on the power adjustment factor, so that a sum of second transmit power of the remaining two SRS resource sets is less than or equal to the power threshold of the time domain resource.

Optionally, the priority is a sequence of set numbers of the plurality of SRS resource sets.

The priority may be determined based on the sequence of set numbers of the plurality of SRS resource sets, for example, second transmit power of an SRS resource set with a relatively small set number is preferentially set to 0, or another priority may be determined based on the sequence of set numbers.

Optionally, the priority is a priority of a resource type of each of the plurality of SRS resource sets, and the priority of the resource type is a priority determined based on an emergency degree of information transmitted on a resource.

The priority may be determined based on the resource type corresponding to each of the plurality of SRS resource sets. The resource type may be a periodic type, an aperiodic type, a semi-persistent type, or the like. For example, a priority of an SRS resource set corresponding to the aperiodic resource type is higher than a priority of an SRS resource set corresponding to the semi-persistent resource type, and the priority of the SRS resource set corresponding to the semi-persistent resource type is higher than a priority of an SRS resource set corresponding to the periodic resource type. A lower priority of a resource type indicates that second transmit power of an SRS resource set corresponding to the resource type is more preferentially set to 0.

During resource allocation, a resource collision may occur. For example, the resource collision occurs between a periodic SRS resource set and a burst SRS resource set during resource allocation. In this case, a communications system determines the priority based on the resource type. When a collision occurs in a power control scenario (to be specific, transmit power for simultaneously transmitting SRSs on a plurality of SRS resource sets is greater than maximum transmit power of a time domain resource), a defined priority of a resource type may be used as a priority in the power control scenario, or a priority may be specifically defined for the power control scenario, to determine a sequence in which second transmit power of the plurality of SRS resource sets is set to 0.

Figure 6:
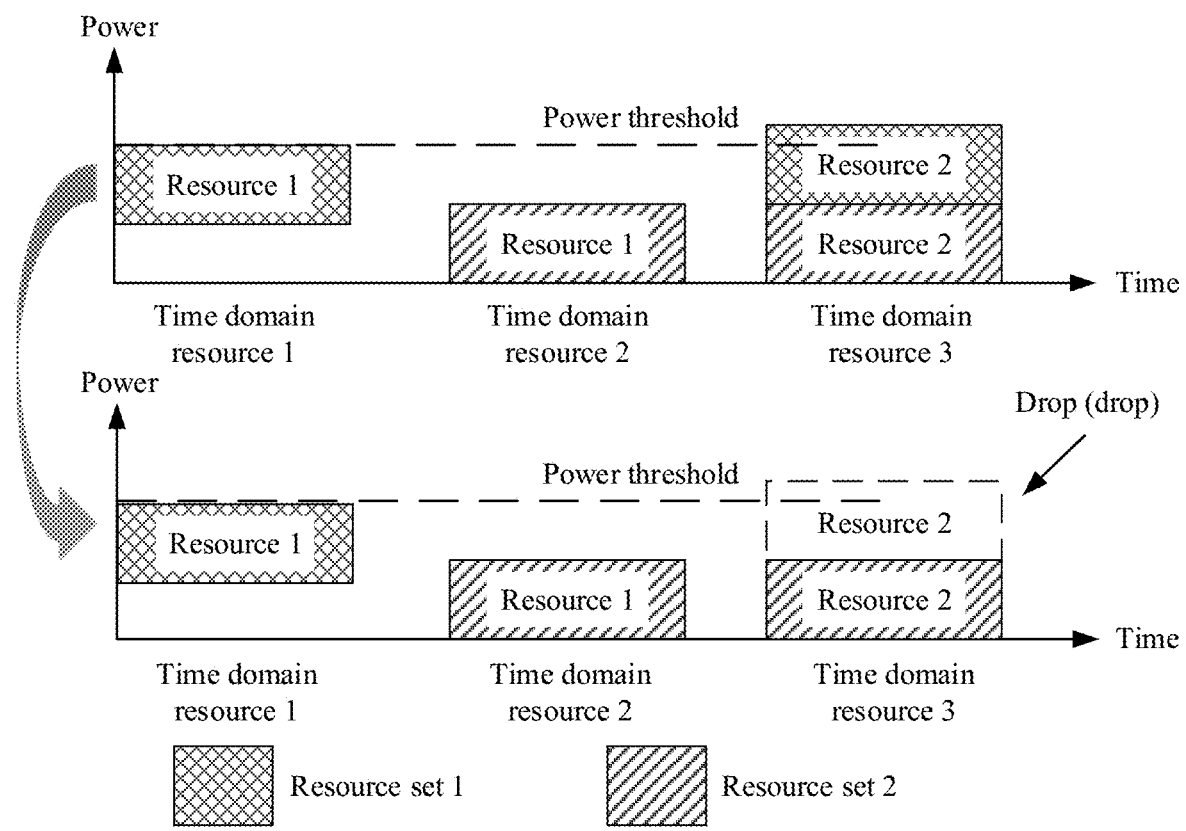
FIG. 6 is a schematic diagram of still another method for adjusting first transmit power of a plurality of SRS resource sets according to this application.

FIG. 6 is a schematic diagram of still another method for adjusting the first transmit power of the plurality of SRS resource sets according to this application.

As shown in FIG. 6, a resource set 1 and a resource set 2 are two SRS resource sets corresponding to a same time domain resource. The resource set 1 includes two resources, and the resource set 2 includes two resources. In one time domain resource, each resource set has only one resource used to send an SRS. In a time domain resource 3, a sum of first transmit power corresponding to a resource 2 in the resource set 1 and first transmit power corresponding to a resource 2 in the resource set 2 is greater than a power threshold of the time domain resource 3. Therefore, the first transmit power of the two resources on the time domain resource 3 needs to be reduced. Priorities of the resource set 1 and the resource set 2 may be determined according to S323, and a drop operation is performed, based on the priorities, on a plan for sending the SRS on one of the resource sets. To be specific, second transmit power that the one of the resource sets has on the time domain resource 3 is set to 0, to reduce a sum of the first transmit power of the two resources on the time domain resource 3.

For example, it is determined, based on a sequence in ascending order of set numbers of the resource sets, that a priority of performing the drop operation on the resource set 1 is higher than a priority of performing the drop operation on the resource set 2. A dashed-line box in FIG. 6 represents that the drop operation is performed on the plan of the resource set 1 for sending the SRS on the time domain resource 3.

For another example, if the resource set 1 is a periodic SRS resource set, the resource set 2 is an aperiodic SRS resource set, and the aperiodic SRS resource set is usually used to transmit burst important data, it is determined, based on resource types of the resource sets, that a priority of performing the drop operation on the resource set 1 is higher than a priority of performing the drop operation on the resource set 2. To be specific, when a sum of first transmit power that the resource set 1 and the resource set 2 has on one time domain resource is greater than a power threshold of the time domain resource, a drop operation is first performed on the resource set 1, and the drop operation is shown in a dashed-line box in FIG. 6.

In FIG. 6, an image in an upper part represents first transmit power corresponding to the resource set 1 and first transmit power corresponding to the resource set 2, an image in a lower part represents second transmit power corresponding to the resource set 1 and second transmit power corresponding to the resource set 2, and an arrow represents performing the drop operation on the resource set 1 according to S323.

The following briefly describes an SRS resource set configuration method in the sounding reference signal transmission method provided in this application.

A network device sends SRS configuration information to a terminal device by using RRC signaling. The SRS configuration information is used to configure one or more SRS resource sets.

The SRS configuration information includes:

a power control parameter that is required for sending the SRS and that corresponds to each SRS resource set includes an open-loop power value P0, a path loss coefficient $\alpha$, a reference signal resource for calculating a path loss, and a closed-loop power value h; and time domain information, frequency domain information, and code domain information of all SRS resources in each SRS resource set, for example, a symbol (a time domain resource) included in one SRS resource, and a port (a code domain resource) and a frequency domain resource (a quantity of resource blocks RB) and resource block numbers) corresponding to each symbol, a type (including periodic, aperiodic, or semi-persistent) of an SRS resource in each SRS resource set, and other information for generating an SRS sequence.

The terminal device receives the RRC signaling, determines, based on the SRS configuration information and according to the method 200 and/or the method 300, transmit power of each port corresponding to each SRS resource in each SRS resource set, and transmits the SRS based on the determined transmit power of each port.

The foregoing SRS resource set configuration method is merely an example for description, and the SRS resource set configuration method applicable to this application is not limited thereto.

The foregoing describes in detail the sounding reference signal transmission method provided in this application with reference to FIG. 1 to FIG. 6. The following describes in detail a sounding reference signal transmission apparatus provided in this application with reference to FIG. 7 to FIG. 9.

Figure 7:
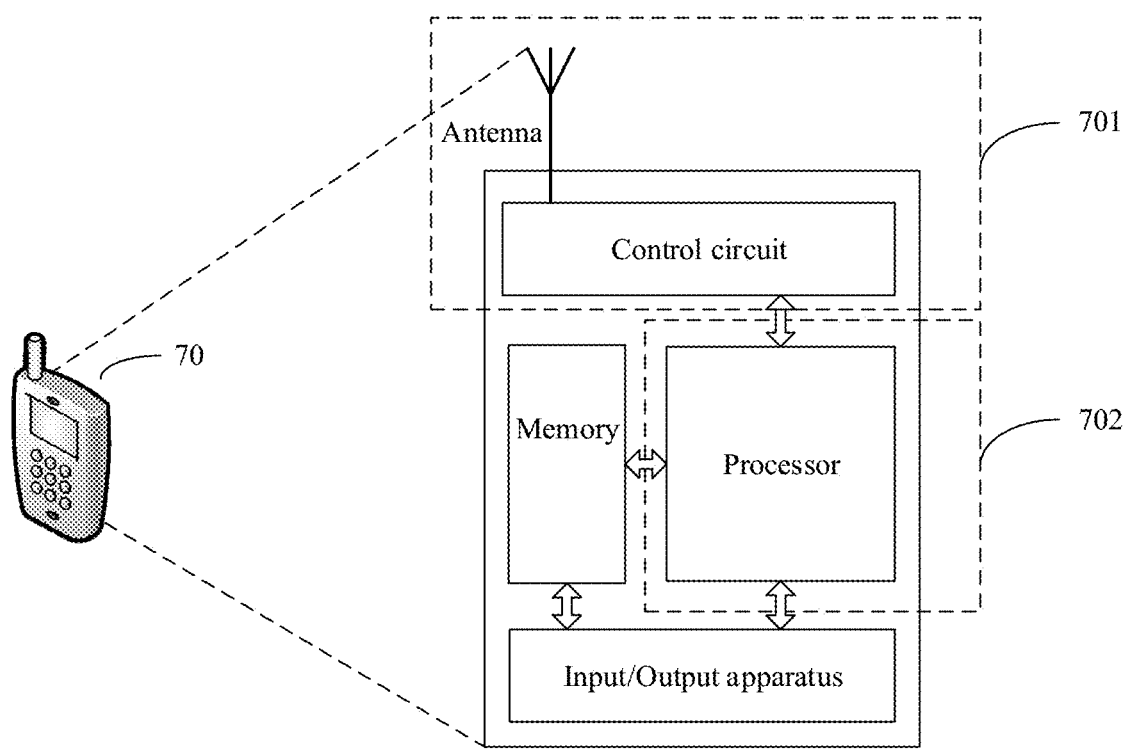
FIG. 7 is a schematic structural diagram of a terminal device according to this application.

FIG. 7 is a schematic structural diagram of a terminal device according to this application. The terminal device may be applied to the system shown in FIG. 1, and perform a function of the terminal device in the foregoing method embodiments. For ease of description, FIG. 7 shows only main components of the terminal device. As shown in FIG. 7, the terminal device 70 includes a processor, a memory, a control circuit, an antenna, and an input/output apparatus. The processor is mainly configured to: process a communications protocol and communication data, control the entire terminal device, execute a software program, and process data of the software program. For example, the processor is configured to support the terminal device in performing the actions described in the foregoing method embodiments, for example, sending uplink data based on reference signal indication information. The memory is mainly configured to store the software program and data, for example, store a correspondence that is between indication information and combination information and that is described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to receive and transmit a radio frequency signal in an electromagnetic wave form. The input/output apparatus, such as a touchscreen, a display, or a keyboard, is mainly configured to receive data entered by a user and output data to the user.

After the terminal device is powered on, the processor may read the software program in a storage unit (e.g. the memory), explain and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 7 shows only one memory and only one processor. An actual terminal device may have a plurality of processors and a plurality of memories. The memory may also be referred to as a storage medium, a storage device, or the like. This is not limited in this application.

In an optional implementation, the processor may include a baseband processor and/or a central processing unit. The baseband processor is mainly configured to process the communications protocol and the communication data. The central processing unit is mainly configured to: control the entire terminal device, execute the software program, and process the data of the software program. Functions of the baseband processor and the central processing unit may be integrated into the processor in FIG. 7. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. The function of processing the communication protocol and the communication data may be embedded in the processor, or may be stored in a storage unit in a form of the software program. The processor executes the software program to implement a baseband processing function.

In this embodiment of this application, an antenna and a control circuit that have sending and receiving functions may be considered as a transceiver unit 701 that is of the terminal device 70 and, for example, that is configured to support the terminal device in performing the receiving function and the sending function shown in FIG. 2 and/or FIG. 3. A processor having a processing function is considered as a processing unit 702 of the terminal device 70. As shown in FIG. 7, the terminal device 70 includes the transceiver unit 701 and the processing unit 702. The transceiver unit may also be referred to as a transceiver, a transceiver machine, a transceiver apparatus, or the like. Optionally, a device that is configured to implement the receiving function and that is in the transceiver unit 701 may be considered as a receiving unit, and a device that is configured to implement the sending function and that is in the transceiver unit 701 may be considered as a sending unit. That is, the transceiver unit 701 includes the receiving unit and the sending unit. The receiving unit may also be referred to as a receiver, an input port, a receiving circuit, or the like. The sending unit may be referred to as a transmitter machine, a transmitter, a transmitting circuit, or the like.

The processor 702 may be configured to execute an instruction stored in the memory, to control the transceiver unit 701 to receive a signal and/or send a signal, to complete a function of the terminal device in the foregoing method embodiments. In an implementation, it may be considered that functions of the transceiver unit 701 are implemented by using a transceiver circuit or a transceiver-dedicated chip.

Figure 8:
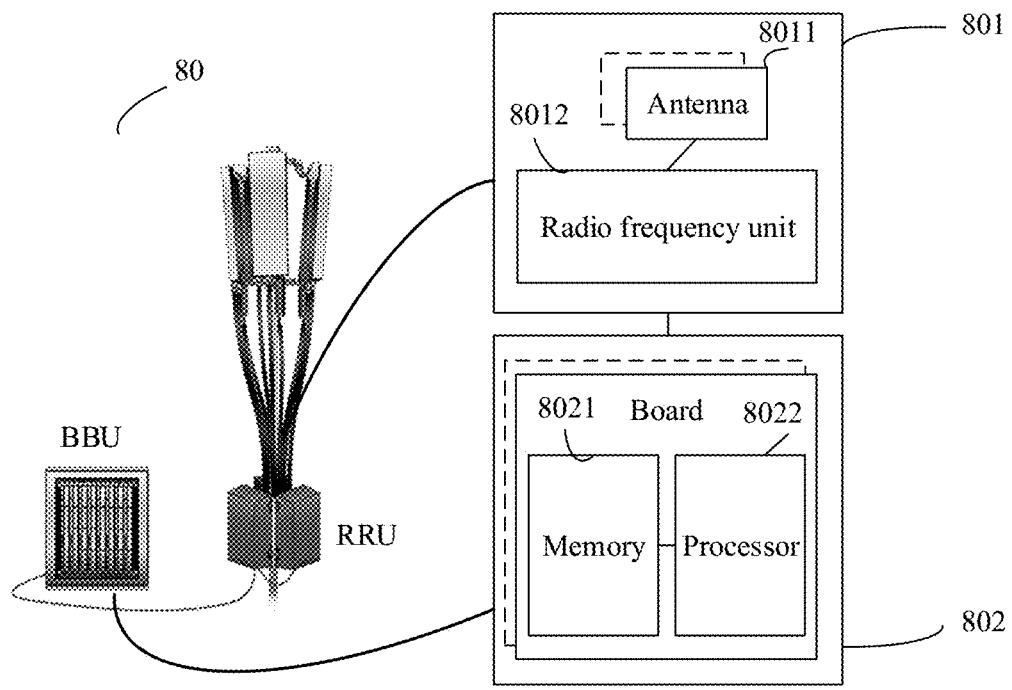
FIG. 8 is a schematic structural diagram of a network device according to this application.

FIG. 8 is a schematic structural diagram of a network device according to an embodiment of this application, for example, may be a schematic structural diagram of a base station. As shown in FIG. 8, the base station may be applied to a system shown in FIG. 1, to perform a function of the network device in the foregoing method embodiments. A base station 80 may include one or more radio frequency units, such as a remote radio unit (RRU) 801 and one or more baseband units (BBU) (which may also be referred to as digital units (digital unit, DU)) 802. The RRU 801 may be referred to as a transceiver unit, a transceiver machine, a transceiver circuit, a transceiver, or the like, and may include at least one antenna 8011 and a radio frequency unit 8012. The RRU 801 is mainly configured to: receive and send a radio frequency signal, and perform conversion between the radio frequency signal and a baseband signal, for example, configured to receive the SRS in the foregoing embodiments. The BBU 802 is mainly configured to: perform baseband processing, control the base station, and the like. The RRU 801 and the BBU 802 may be physically disposed together, or may be physically separated, for example, in a distributed base station.

The BBU 802 is a control center of the base station, or may be referred to as a processing unit, and is mainly configured to complete baseband processing functions such as channel coding, multiplexing, modulation, and spreading. For example, the BBU (the processing unit) 802 may be configured to control the base station to perform an operation procedure that is related to the network device and that is in the foregoing method embodiments.

In an example, the BBU 802 may include one or more boards, and a plurality of boards may jointly support a radio access network (such as an LTE network) of a single access standard, or may separately support radio access networks (such as the LTE network, and a 5G network or another network) of different access standards. The BBU 802 further includes a memory 8021 and a processor 8022. The memory 8021 is configured to store a necessary instruction and necessary data. For example, the memory 8021 stores the correspondence between an index of the codebook and the precoding matrix in the foregoing embodiments. The processor 8022 is configured to control the base station to perform a necessary action, for example, configured to control the base station to perform the operation procedure that is of the network device and that is in the foregoing method embodiments. The memory 8021 and the processor 8022 may serve one or more boards. In other words, a memory and a processor may be independently disposed on each board. Alternatively, a plurality of boards may share the same memory and the same processor. In addition, a necessary circuit may be further disposed on each board.

Figure 9:
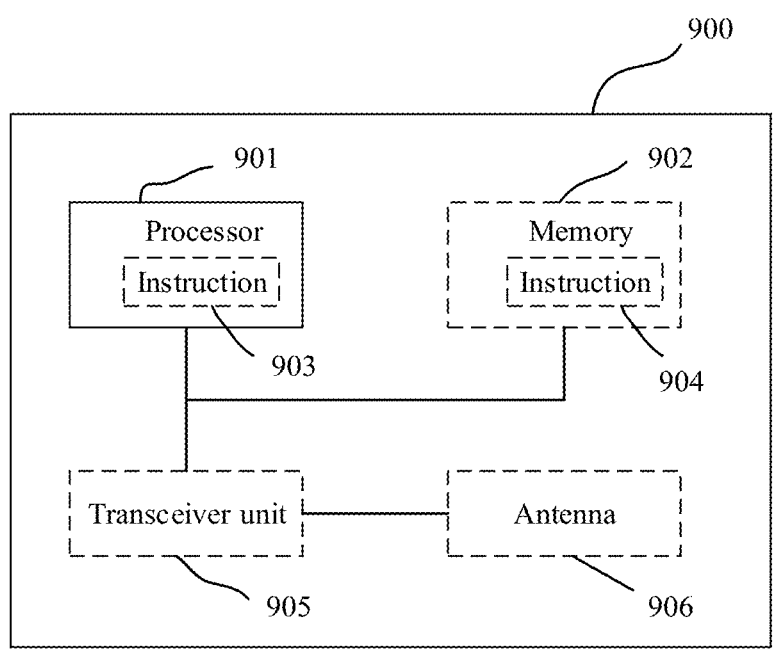
FIG. 9 is a schematic structural diagram of a communications apparatus according to this application.

FIG. 9 is a schematic structural diagram of a communications apparatus 900. The apparatus 900 may be configured to perform the steps of the method described in the foregoing method embodiments. For details, refer to the descriptions in the foregoing method embodiments. The communications apparatus 900 may be a chip, a network device (such as a base station), a terminal device, another network device, or the like.

The communications apparatus 900 includes one or more processors 901. The processor 901 may be a general purpose processor, a dedicated processor, or the like, for example, may be a baseband processor or a central processing unit. The baseband processor may be configured to process a communication protocol and communication data, and the central processing unit may be configured to: control a communications apparatus (such as the base station, a terminal, or a chip), execute a software program, and process data of the software program. The communications apparatus may include a transceiver unit, configured to input (receive) and output (send) a signal. For example, the communications apparatus may be a chip, and the transceiver unit may be an input and/or output circuit or a communications interface of the chip. The chip may be used for the terminal, the base station, or the another network device. For another example, the communications apparatus may be a terminal, the base station, or the another network device, and the transceiver unit may be a transceiver, a radio frequency chip, or the like.

The communications apparatus 900 includes one or more processors 901. The one or more processors 901 may implement a function of the network device or the terminal device in the embodiment shown in FIG. 2 and/or the embodiment shown in FIG. 3.

In a possible design, the communications apparatus 900 includes a part (means) configured to generate an SRS and a part (means) configured to send the SRS. Functions of the part (means) for generating the SRS and the part (means) for sending the SRS may be implemented by using one or more processors. For example, the SRS may be generated by using one or more processors, and the SRS is sent by using the transceiver, an input/output circuit, or an interface of the chip. For a method for sending the SRS, refer to related descriptions in the foregoing method embodiments.

Optionally, in addition to implementing the function of the embodiment shown in FIG. 2 and/or the embodiment shown in FIG. 3, the processor 901 may further implement another function.

Optionally, in a design, the processor 901 may execute instructions, so that the communications apparatus 900 performs the steps described in the foregoing method embodiments. All or some of the instructions may be stored in the processor, for example, the instruction 903. Alternatively, all or some of the instructions may be stored in the memory 902 coupled to the processor, for example, the instruction 904. Alternatively, the communications apparatus 900 may be enabled, by using both instructions 903 and 904, to perform the steps described in the foregoing method embodiments.

In still another possible design, the communications apparatus 900 may alternatively include a circuit. The circuit may implement a function of the network device or the terminal device in the foregoing method embodiments.

In still another possible design, the communications apparatus 900 may include one or more memories 902 that store an instruction 904. The instruction may be run on the processor, to enable the communications apparatus 900 to perform the method described in the foregoing method embodiments. Optionally, the memory may further store data. Optionally, the processor may also store an instruction and/or data. For example, the one or more memories 902 may store the correspondence described in the foregoing embodiments, or the related parameter or table provided in the foregoing embodiments. The processor and the memory may be disposed separately, or may be integrated together.

In still another possible design, the communications apparatus 900 may further include a transceiver unit 905 and an antenna 906. The processor 901 may be referred to as a processing unit, and controls the communications apparatus (the terminal or the base station). The transceiver unit 905 may be referred to as a transceiver machine, a transceiver circuit, a transceiver or the like, and is configured to implement sending and receiving functions of the communications apparatus through the antenna 906.

This application further provides a communications system, including one or more of the foregoing network devices and one or more of the foregoing terminal devices.

It should be noted that, the processor in the embodiments of this application may be an integrated circuit chip, and has a signal processing capability. In an implementation process, steps in the foregoing method embodiments may be implemented by using a hardware integrated logic circuit in the processor or an instruction in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the method, steps, and logical block diagrams disclosed in the embodiments of this application. The general purpose processor may be a microprocessor, or the processor may be any conventional processor or the like. The steps of the method disclosed with reference to the embodiments of this application may be directly performed and completed by using a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification includes but is not limited to these memories and memories of any other proper types.

An embodiment of this application further provides a computer-readable medium. The computer-readable medium stores a computer program, and when being executed by a computer, the computer program implements a function in any one of the foregoing method embodiments.

This application further provides a computer program product, and when being executed by a computer, the computer program product implements a function in any one of the foregoing method embodiments.

All or some of the foregoing embodiments may be implemented by using software, hardware, firmware, or any combination thereof. When software is used for implementation, the embodiments may be implemented completely or partially in a form of the computer program product. The computer program product includes one or more computer instructions. When the one or more computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid-state drive (SSD)), or the like.

This application further provides a processing apparatus, including a processor and an interface, and the processor is configured to perform the steps in any one of the foregoing method embodiments.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general purpose processor. The general purpose processor is implemented by reading software code stored in a memory. The memory may be integrated into the processor, may be located outside the processor, or may exist independently.

It should be understood that an "embodiment" mentioned in the entire specification means that particular characteristics, structures, or features related to the embodiment are included in at least one embodiment of this application. Therefore, embodiments in the entire specification may not necessarily be same embodiments. In addition, these particular characteristics, structures, or features may be combined in one or more embodiments in any appropriate manner. It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

In addition, the terms "system" and "network" in this specification may be often interchangeably used in this specification. The term "and/or" in this specification is only an association relationship for describing associated objects and represents that there may be three relationships. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and that B may be determined based on A. However, it should further be understood that determining B based on A does not mean that B is determined based on only A. B may alternatively be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe interchangeability between the hardware and the software, the foregoing has generally described compositions and steps of each example based on functions. Whether the functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and unit, refer to a corresponding process in the foregoing method embodiments. Details are not described herein again.

In the embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, and indirect couplings or communication connections between the apparatuses or units may be electrical connections, mechanical connections, or connections in other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions in the embodiments of this application.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can be used to carry or store expected program code in a form of an instruction or a data structure and that can be accessed by the computer. In addition, any connection may be appropriately defined as the computer-readable medium. For example, if software is transmitted from a website, a server, or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in a definition of a medium to which the coaxial cable, optical fiber/cable, twisted pair, DSL, or the wireless technologies such as infrared ray, radio, and microwave belong. A disk (Disk) and a disc (disc) used in this application includes a compact disc (CD), a laser disc, an optical disc, a digital versatile disc (DVD), a floppy disk, and a Blu-ray disc. The disk usually magnetically copies data, and the disc optically copies data by using a laser. The foregoing combination should also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A communication method, comprising:
    determining a plurality of pieces of first transmit power corresponding to a plurality of sounding reference signal (SRS) resource sets on a second time domain resource, wherein the plurality of SRS resource sets are in a one-to-one correspondence with the plurality of pieces of first transmit power;
    determining, based on a value relationship between a power threshold on the second time domain resource and a sum of the plurality of pieces of first transmit power corresponding to the plurality of SRS resource sets on the second time domain resource, a plurality of pieces of second transmit power corresponding to the plurality of SRS resource sets on the second time domain resource, wherein a sum of the plurality of pieces of second transmit power is less than or equal to the power threshold, and the plurality of pieces of second transmit power are in the one-to-one correspondence with the plurality of SRS resource sets; and
    simultaneously transmitting, on the second time domain resource based on the plurality of pieces of second transmit power, SRSs carried in the plurality of SRS resource sets.

2. The method according to claim 1, wherein the determining of the plurality of pieces of second transmit power comprises:
    determining at least one power adjustment factor based on the value relationship between the power threshold on the second time domain resource and the sum of the plurality of pieces of first transmit power corresponding to the plurality of SRS resource sets on the second time domain resource, wherein the at least one power adjustment factor is a value greater than or equal to 0; and
    determining, based on the at least one power adjustment factor and the plurality of pieces of first transmit power corresponding to the plurality of SRS resource sets on the second time domain resource, the plurality of pieces of second transmit power corresponding to the plurality of SRS resource sets on the second time domain resource, wherein the plurality of SRS resource sets comprise a second SRS resource set, the at least one power adjustment factor comprises a first power adjustment factor, and at least one of the plurality of pieces of second transmit power corresponding to the second SRS resource set is equal to a product of the first power adjustment factor and first transmit power corresponding to the second SRS resource set.

3. The method according to claim 2, wherein the determining of the at least one power adjustment factor comprises:
    determining the at least one power adjustment factor when the power threshold on the second time domain resource is less than the sum of the plurality of pieces of first transmit power corresponding to the plurality of SRS resource sets on the second time domain resource.

4. The method according to claim 2, wherein the determining of the at least one power adjustment factor comprises:

determining one power adjustment factor based on the value relationship between the power threshold on the second time domain resource and the sum of the plurality of pieces of first transmit power corresponding to the plurality of SRS resource sets on the second time domain resource, wherein when the sum of the plurality of pieces of first transmit power is greater than the power threshold, the power adjustment factor is less than or equal to a value obtained through dividing the power threshold by the sum of the plurality of pieces of first transmit power.

5. The method according to claim 2,
wherein the plurality of SRS resource sets on the second time domain resource comprise a third SRS resource set and the second SRS resource set, SRS transmission of the second SRS resource set on the second time domain resource is an initial transmission, and SRSs in the third SRS resource set are initially transmitted on a third time domain resource before the second time domain resource, wherein the determining of the at least one power adjustment factor comprises:
with the sum of the plurality of pieces of first transmit power on the second time domain resource being greater than the power threshold on the second time domain resource, determining that at least one of the plurality of pieces of second transmit power corresponding to the third SRS resource set is equal to at least one of the plurality of pieces of second transmit power of the third SRS resource set on the third time domain resource; and
determining that a power adjustment factor corresponding to the second SRS resource set is a value less than 1.

6. The method according to claim 1, wherein the determining of the plurality of pieces of second transmit power comprises:
with the sum of the plurality of pieces of first transmit power corresponding to the plurality of SRS resource sets on the second time domain resource being greater than the power threshold on the second time domain resource, determining, based on a priority of each of the plurality of SRS resource sets, that at least one of the plurality of pieces of second transmit power of at least one of the plurality of SRS resource sets is 0,
wherein the priority is used to indicate a sequence in which the plurality of pieces of second transmit power of each of the plurality of SRS resource sets is set to 0, an SRS resource set in the plurality of SRS resource sets other than the at least one SRS resource set is a remaining SRS resource set, a sum of first transmit power of the remaining SRS resource set is less than or equal to the power threshold on the second time domain resource, and at least one of the plurality of pieces of second transmit power of the remaining SRS resource set is equal to the first transmit power of the remaining SRS resource set.

7. The method according to claim 6, wherein the priority is a sequence of set numbers of the plurality of SRS resource sets.

8. The method according to claim 6, wherein the priority is a priority of a resource type of each of the plurality of SRS resource sets, and the priority of the resource type is a priority determined based on an emergency degree of information transmitted on a resource.

9. A communication apparatus, comprising:
a processor, configured to determine a plurality of pieces of first transmit power corresponding to a plurality of sounding reference signal (SRS) resource sets on a second time domain resource, wherein the plurality of SRS resource sets are in a one-to-one correspondence with the plurality of pieces of first transmit power; and to determine, based on a value relationship between a power threshold on the second time domain resource and a sum of the plurality of pieces of first transmit power corresponding to the plurality of SRS resource sets on the second time domain resource, a plurality of pieces of second transmit power corresponding to the plurality of SRS resource sets on the second time domain resource, wherein a sum of the plurality of pieces of second transmit power is less than or equal to the power threshold, and the plurality of pieces of second transmit power are in the one-to-one correspondence with the plurality of SRS resource sets; and
a transmitting circuit, configured to simultaneously transmit, on the second time domain resource based on the plurality of pieces of second transmit power, SRSs carried in the plurality of SRS resource sets.

10. The apparatus according to claim 9, wherein the determining, by the processor, of the plurality of pieces of second transmit power comprises:
determining, at least one power adjustment factor based on the value relationship between the power threshold on the second time domain resource and the sum of the plurality of pieces of first transmit power corresponding to the plurality of SRS resource sets on the second time domain resource, wherein the at least one power adjustment factor is a value greater than or equal to 0; and
determining, based on the at least one power adjustment factor and the plurality of pieces of first transmit power corresponding to the plurality of SRS resource sets on the second time domain resource, the plurality of pieces of second transmit power corresponding to the plurality of SRS resource sets on the second time domain resource, wherein the plurality of SRS resource sets comprise a second SRS resource set, the at least one power adjustment factor comprises a first power adjustment factor, and at least one of the plurality of pieces of second transmit power corresponding to the second SRS resource set is equal to a product of the first power adjustment factor and first transmit power corresponding to the second SRS resource set.

11. The apparatus according to claim 10, wherein the determining, by the processor, of the at least one power adjustment factor comprises:
determining the at least one power adjustment factor when the power threshold on the second time domain resource is less than the sum of the plurality of pieces of first transmit power corresponding to the plurality of SRS resource sets on the second time domain resource.

12. The apparatus according to claim 10, wherein the determining, by the processor, of the at least one power adjustment factor comprises:
determining one power adjustment factor based on the value relationship between the power threshold on the second time domain resource and the sum of the plurality of pieces of first transmit power corresponding to the plurality of SRS resource sets on the second time domain resource,
wherein when the sum of the plurality of pieces of first transmit power is greater than the power threshold, the power adjustment factor is less than or equal to a value obtained through dividing the power threshold by the sum of the plurality of pieces of first transmit power.

13. The apparatus according to claim 10, wherein the plurality of SRS resource sets on the second time domain resource comprise a third SRS resource set and the second SRS resource set, SRS transmission of the second SRS resource set on the second time domain resource is initial transmission, and SRSs in the third SRS resource set are initially transmitted on a third time domain resource before the second time domain resource, wherein the determining, by the processor, of the at least one power adjustment factor comprises:

with the sum of the plurality of pieces of first transmit power on the second time domain resource being greater than the power threshold on the second time domain resource, determining that at least one of the plurality of pieces of second transmit power corresponding to the third SRS resource set is equal to at least one of the plurality of pieces of second transmit power of the third SRS resource set on the third time domain resource; and determining that a power adjustment factor corresponding to the second SRS resource set is a value less than 1.

14. The apparatus according to claim 9, wherein the determining, by the processor, of the plurality of pieces of second transmit power comprises:

with the sum of the plurality of pieces of first transmit power corresponding to the plurality of SRS resource sets on the second time domain resource being greater than the power threshold on the second time domain resource, determine, based on a priority of each of the plurality of SRS resource sets, that at least one of the plurality of second transmit power of at least one of the plurality of SRS resource sets is 0, wherein the priority is used to indicate a sequence in which second transmit power of each of the plurality of SRS resource sets is set to 0, an SRS resource set in the plurality of SRS resource sets other than the at least one SRS resource set is a remaining SRS resource set, a sum of first transmit power of the remaining SRS resource set is less than or equal to the power threshold on the second time domain resource, and second transmit power of the remaining SRS resource set is equal to the first transmit power of the remaining SRS resource set.

15. The apparatus according to claim 14, wherein the priority is a sequence of set numbers of the plurality of SRS resource sets.

16. The apparatus according to claim 14, wherein the priority is a priority of a resource type of each of the plurality of SRS resource sets, and the priority of the resource type is a priority determined based on an emergency degree of information transmitted on a resource.

17. A communication method, comprising:

determining a quantity of ports corresponding to each of a plurality of sounding reference signal (SRS) resources on a first time domain resource, wherein the plurality of SRS resources belong to a first SRS resource set;

determining, based on the quantity of ports corresponding to the each of the plurality of SRS resources and transmit power corresponding, in a first time unit, to the first SRS resource set, transmit power of each port corresponding to the each of the plurality of SRS resources, wherein a sum of transmit power of all ports corresponding to the plurality of SRS resources is less than or equal to the transmit power corresponding to the first SRS resource set, and the first time unit comprises the first time domain resource, or the first time unit is the first time domain resource; and simultaneously transmitting, on the first time domain resource based on the transmit power of the each port corresponding to the each of the plurality of SRS resources, SRSs carried in the plurality of SRS resources.

18. The method according to claim 17, wherein the transmit power of each port corresponding to each of the plurality of SRS resources is equal.

19. The method according to claim 17, wherein the determining of the transmit power of each port corresponding to each of the plurality of SRS resources comprises:

determining, based on a quantity of the plurality of SRS resources on the first time domain resource and the transmit power corresponding, in the first time unit, to the first SRS resource set, the transmit power corresponding to each of the plurality of SRS resources, wherein the transmit power corresponding to each of the plurality of SRS resources is equal, and a sum of the transmit power corresponding to all of the plurality of SRS resources is less than or equal to the transmit power corresponding, in the first time unit, to the first SRS resource set; and determining, based on the transmit power corresponding to each of the plurality of SRS resources on the first time domain resource and the quantity of ports corresponding to each of the plurality of SRS resources, the transmit power of each port corresponding to each of the plurality of SRS resources, wherein a sum of the transmit power of all ports corresponding to any one of the plurality of SRS resources is less than or equal to the transmit power corresponding to any one SRS resource.

20. A communication apparatus, comprising:

a processor, configured to determine a quantity of ports corresponding to each of a plurality of sounding reference signal (SRS) resources on a first time domain resource, wherein the plurality of SRS resources belong to a first SRS resource set, and configured to determine, based on the quantity of ports corresponding to the each of the plurality of SRS resources and transmit power corresponding, in a first time unit, to the first SRS resource set, transmit power of each port corresponding to the each of the plurality of SRS resources, wherein a sum of transmit power of all ports corresponding to the plurality of SRS resources is less than or equal to the transmit power corresponding to the first SRS resource set, and the first time unit comprises the first time domain resource, or the first time unit is the first time domain resource; and a transmitting circuit, configured to simultaneously transmit, on the first time domain resource based on the transmit power of the each port corresponding to the each of the plurality of SRS resources, SRSs carried in the plurality of SRS resources.

* * * * *